(12) United States Patent
Chidlovskii et al.

(10) Patent No.: US 11,927,448 B2
(45) Date of Patent: Mar. 12, 2024

(54) DEEP SMARTPHONE SENSORS FUSION FOR INDOOR POSITIONING AND TRACKING

(71) Applicants: NAVER CORPORATION, Gyeonggi-do (KR); NAVER LABS CORPORATION, Gyeonggi-do (KR)

(72) Inventors: Boris Chidlovskii, Meylan (FR); Leonid Antsfeld, Saint Ismier (FR); Emilio Sansano, Onda (ES)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 357 days.

(21) Appl. No.: 17/477,701

(22) Filed: Sep. 17, 2021

(65) Prior Publication Data

US 2022/0155079 A1 May 19, 2022

(30) Foreign Application Priority Data

Nov. 13, 2020 (EP) ..................................... 20306380

(51) Int. Cl.
*G06F 17/00* (2019.01)
*G01C 21/20* (2006.01)
(Continued)

(52) U.S. Cl.
CPC ............ *G01C 21/206* (2013.01); *G01V 3/08* (2013.01); *G06F 18/2148* (2023.01); *G06F 18/24* (2023.01); *G06N 3/02* (2013.01)

(58) Field of Classification Search
CPC ...... G01C 21/206; G01C 21/188; G01V 3/08; G06F 18/2148; G06F 18/24; G06N 3/02;
(Continued)

(56) References Cited

U.S. PATENT DOCUMENTS 10,429,196 B2 * 10/2019 Al-Hamad .............. G01P 15/02
2015/0119086 A1 * 4/2015 Mirowski ............ G01C 21/206
455/456.6
(Continued)

FOREIGN PATENT DOCUMENTS

EP 3798918 A1 3/2021

OTHER PUBLICATIONS

Smartphone based indoor localization using permanent magnets and artificial intelligence for pattern recognition (Year: 2023).*
(Continued)

*Primary Examiner* — Ronnie M Mancho

(57) ABSTRACT

A computer-implemented method of determining a position of a portable electronic device in an indoor environment includes: at a first rate, updating an absolute position of a portable electronic device within the indoor environment based on at least one of radio signal data and magnetic field data captured using the portable electronic device; at a second rate that is different than the first rate, selectively updating an estimated displacement of the portable electronic device within the indoor environment, the updating the estimated displacement comprising generating an estimated displacement, by a neural network module, based on inertial sensor data of the portable electronic device; and determining a present position of the portable electronic device within the indoor environment by updating a previous position based on at least one of (a) the estimated displacement and (b) the absolute position.

26 Claims, 15 Drawing Sheets

(51) Int. Cl.
  *G01V 3/08* (2006.01)
  *G06F 18/214* (2023.01)
  *G06F 18/24* (2023.01)
  *G06N 3/02* (2006.01)

(58) Field of Classification Search
  CPC ........ G06N 3/04; G06N 20/00; G01S 5/0263; G01S 5/02585; G01S 5/0294; G01S 2205/02
  USPC ......................................................... 701/408
  See application file for complete search history.

(56) References Cited

U.S. PATENT DOCUMENTS

| | | | |
|---|---|---|---|
| 2016/0227366 A1 | 8/2016 | Georgy et al. | |
| 2016/0371394 A1* | 12/2016 | Shahidi | G01S 5/02526 |
| 2017/0153110 A1* | 6/2017 | Matsushita | G01C 21/1654 |
| 2018/0259350 A1* | 9/2018 | Al-Hamad | G01C 21/188 |
| 2021/0097387 A1 | 4/2021 | Chidlovskii et al. | |
| 2021/0114204 A1* | 4/2021 | Hong | G06V 20/10 |
| 2022/0155402 A1* | 5/2022 | Nawaz | G01C 21/206 |
| 2023/0243658 A1* | 8/2023 | Yilmaz | G01C 21/005 701/400 |

OTHER PUBLICATIONS

European Search Report for European Application No. 23153904.0 dated May 16, 2023.
A. Khalajmehrabadi, N. Gatsis, and D. Akopian. Modern wlan fingerprinting indoor positioning methods and deployment challenges. IEEE Communications Surveys Tutorials, 19(3):1974-2002, 2016.
Alwin Poulose, Jihun Kim, and Dong Han. A sensor fusion framework for indoor localization using smartphone sensors and wi-fi rssi measurements. Applied Sciences, 9:4379, Oct. 2019.
Antonio Jiménez, Fernando Seco, and Joaquín Torres-Sospedra. Tools for smartphone multi-sensor data registration and gt mapping for positioning applications. Oct. 2019.
Arto Perttula, Helena Leppäkoski, Martti Kirkko-Jaakkola, Pavel Davidson, Jussi Collin, and Jarmo Takala. Distributed indoor positioning system with inertial measurements and map matching. IEEE Trans. Instrumentation and Measurement, 63(11):2682-2695, 2014.
Baoding Zhou, Jun Yang, and Qingquan Li. Smartphone-based activity recognition for indoor localization using a convolutional neural network. Sensors, 19:621, Feb. 2019.
Bedartha Goswami. A brief introduction to nonlinear time series analysis and recurrence plots. Vibration, 2019, 2, 332-368.
Björn Gressmann, Helge Sören Klimek, and Volker Turau. Towards ubiquitous indoor location based services and indoor navigation. In 7th Workshop on Positioning Navigation and Communication, WPNC, pp. 107-112. IEEE, 2010.
Boris Chidlovskii and Leonid Antsfeld. Semi-supervised variational autoencoder for wifi indoor localization. In Intern. Conf. Indoor Positioning and Indoor Navigation (IPIN), pp. 1-8. IEEE, 2019.
Brian Ferris, Dieter Fox, and Neil D. Lawrence. Wifi-slam using Gaussian process latent variable models. In Manuela M. Veloso, editor, Proc. 20th Intern. Joint Conference on Artificial Intelligence (IJCAI), pp. 2480-2485, 2007.
Chaoyun Zhang, Paul Patras, and Hamed Haddadi. Deep learning in mobile and wireless networking: A survey. IEEE Communications Surveys and Tutorials, (3):2224-2287, 2019.
D. P. Kingma and M. Welling. An Introduction to Variational Autoencoders. Now Foundations and Trends, 2019.
David E Rumelhart, Geoffrey E Hinton, and Ronald J Williams. Learning representations by back-propagating errors. Nature, 323(6088): 533, 1986.
David Hanley, Alexander B. Faustino, Scott D. Zelman, David A. Degenhardt, and Timothy Bretl. MagPIE: a dataset for indoor positioning with magnetic anomalies. Intern. Conf. Indoor Positioning and Indoor Navigation (IPIN), pp. 1-8, 2017.
Diederik P Kingma and Jimmy Ba. Adam: A method for stochastic optimization. arXiv preprint arXiv:1412.6980, 2014.
European Search Report for European Application No. 20 30 6380 dated Apr. 28, 2021.
Faheem Zafari, Athanasios Gkelias, and Kin Leung. A survey of indoor localization systems and technologies. CoRR, abs/1709. 01015, 2017.
Fuqiang Gu, Xuke Hu, Milad Ramezani, Debaditya Acharya, Kourosh Khoshelham, Shahrokh Valaee, and Jianga Shang. "Indoor Localization Improved by Spatial Context—A Survey", ACM Computing Surveys; vol. 52, No. 3, Article 64; Jul. 3, 2019, pp. 1-35, XP058450992.
Heba Abdelnasser, Reham Mohamed, Ahmed Elgohary, Moustafa Farid Alzantot, He Wang, Souvik Sen, Romit Roy Choudhury, and Moustafa Youssef. Semanticslam: Using environment landmarks for unsupervised indoor localization. IEEE Trans. Mob. Comput., 15(7):1770-1782, 2016.
Huy Tran, Santosh Pandey, and Nirupama Bulusu. Online map matching for passive indoor positioning systems. In Proc. 15th Annual Intern. Conference on Mobile Systems, Applications, and Services (MobiSys), p. 175, 2017.
Imran Ashraf, Soojung Hur, and Yongwan Park. Enhancing performance of magnetic field based indoor localization using magnetic patterns from multiple smartphones. Sensors, 20(9):2704, 2020.
IPIN 2019 Indoor Localization Competition: Track 3 "Smartphone based (off site)". http://indoorloc.uji.es/ipin2019track3/. 2019.
J. H. Lee, B. Shin, C. Kim, J. Kim, S. Lee, and T. Lee. Real time adaptive step length estimation for smartphone user. In Intern. Conf. Control, Automation and Systems, pp. 382-385, 2013.
J. Yoo and K. H. Johansson. Semi-supervised learning for mobile robot localization using wireless signal strengths. In Intern. Conf. Indoor Positioning and Indoor Navigation (IPIN), pp. 1-8, 2017.
Jindong Wang, Yiqiang Chen, Shuji Hao, Xiaohui Peng, and Lisha Hu. Deep learning for sensor-based activity recognition: A survey. Pattern Recognit. Lett., 119:3-11, 2019.
Jingxue Bi, Yunjia Wang, Zengke Li, Shenglei Xu, Jiapeng Zhou, Meng Sun, and Minghao Si. Fast radio map construction by using adaptive path loss model interpolation in large-scale building. Sensors, 19(3):712, 2019.
Khanh Nguyen-Huu, KyungHo Lee, and Seon-Woo Lee. An indoor positioning system using pedestrian dead reckoning with wifi and map-matching aided. In Intern. Conf. Indoor Positioning and Indoor Navigation (IPIN), pp. 1-8, 2017.
Mehdi Mohammadi, Ala Al-Fuqaha, Mohsen Guizani, and Jun-Seok Oh. Semisupervised Deep Reinforcement Learning in Support of IoT and Smart City Services. IEEE Internet of Things Journal, 5(2), 2018.
Namkyoung Lee, Sumin Ahn, and Dongsoo Han. AMID: accurate magnetic indoor localization using deep learning. Sensors, 18(5):1598, 2018.
Negar Ghourchian, Michel Allegue-Martínez, and Doina Precup. Real-time indoor localization in smart homes using semi-supervised learning. In Proc. Twenty-Ninth AAAI Conference on Artificial Intelligence, pp. 4670-4677, 2017.
Norbert Marwan. A historical review of recurrence plots. The European Physical Journal Special Topics, 164:3-12, Oct. 2008.
P. Davidson and R. Piché. A survey of selected indoor positioning methods for smartphones. IEEE Communications Surveys Tutorials, 19(2):1347-1370, 2017.
Qu Wang, Langlang Ye, Haiyong Luo, Aidong Men, Fang Zhao, and Yan Huang. Pedestrian Stride-Length Estimation Based on LSTM and Denoising Autoencoders. Sensors, 19(4), 2019.
Robert Harle. A survey of indoor inertial positioning systems for pedestrians. IEEE Communications Surveys and Tutorials, 15(3):1281-1293, 2013.
S. H. Shin, C. G. Park, J. W. Kim, H. S. Hong, and J. M. Lee. Adaptive step length estimation algorithm using low-cost mems inertial sensors. In IEEE Sensors Applications Symposium, pp. 1-5, 2007.
S. Khoshrou, J.S. Cardoso, and L.F. Teixeira. Learning from evolving video streams in a multi-camera scenario. Machine Learning, 100:609-633, 2015.

(56) References Cited

OTHER PUBLICATIONS

Sebastian Hilsenbeck, Dmytro Bobkov, Georg Schroth, Robert Huitl, and Eckehard Steinbach. Graph-based Data Fusion of Pedometer and WiFi Measurements for Mobile Indoor Positioning. In ACM International Joint Conference on Pervasive and Ubiquitous Computing, pp. 147-158, 2014.

Sepp Hochreiter and Jürgen Schmidhuber. Long short-term memory. Neural computation, 9(8):1735-1780, 1997.

Siavash Hosseinyalamdary. Deep Kalman Filter: Simultaneous Multi-Sensor Integration and Modelling; A GNSS/IMU Case Study. Sensors, 18(5):1316, Apr. 2018.

Teemu Pulkkinen, Teemu Roos, and Petri Myllymäki. Semi-supervised learning for WLAN positioning. In Artificial Neural Networks and Machine Learning (ICANN), pp. 355-362, 2011.

The tenth International Conference on Indoor Positioning and Indoor Navigation. http://ipin2019.isti.cnr.it/.

Valerie Renaudin, Miguel Ortiz, Johan Perul, Joaquín Torres-Sospedra, Antonio Jimenez, Antonio Perez-Navarro, German Mendoza-Silva, Fernando Seco, Yael Landau, Revital Marbe, Boaz Ben-Moshe, Xingyu Zheng, Feng Ye, Jian Kuang, Yu Li, Xiaoji Niu, Vlad Landa, Shlomi Hacohen, Nir Shv, and Yongwan Park. Evaluating indoor positioning systems in a shopping mall: The lessons learned from the ipin 2018 competition. IEEE Access, pp. 1-1, Sep. 2019.

Wesllen Sousa Lima, Eduardo Souto, Khalil El-Khatib, Roozbeh Jalali, and João Gama. Human activity recognition using inertial sensors in a smartphone: An overview. Sensors, 19(14):3213, 2019.

Xuyu Wang, Zhitao Yu, and Shiwen Mao. Indoor localization using smartphone magnetic and light sensors: a deep LSTM approach. MONET, 25(2):819-832, 2020.

Y. Yuan, L. Pei, C. Xu, Q. Liu, and T. Gu. Efficient wifi fingerprint training using semi-supervised learning. In Ubiquitous Positioning Indoor Navigation and Location Based Service, pp. 148-155, 2014.

Yongsen Ma, Gang Zhou, and Shuangquan Wang. Wifi sensing with channel state information: A survey. ACM Comput. Surv., 52(3):46:1-46:36, Jun. 2019.

Yoshua Bengio, Patrice Simard, and Paolo Frasconi. Learning long-term dependencies with gradient descent is difficult. IEEE transactions on neural networks, 5(2):157-166, 1994.

Zhenghua Chen, Han Zou, Hao Jiang, Qingchang Zhu, Yeng Chai Soh, and Lihua Xie. Fusion of wifi, smartphone sensors and landmarks using the kalman filter for indoor localization. Sensors, 15(1):715-732, 2015.

Zhi-An Deng, Guofeng Wang, Danyang Qin, Zhenyu Na, Yang Cui, and Juan Chen. Continuous indoor positioning fusing wifi, smartphone sensors and landmarks. Sensors, 16, Sep. 2016.

Zhiguang Wang and Tim Oates. Imaging time-series to improve classification and imputation. Proc. IJCAI, pp. 3939-3945, 2015.

Ashraf Imran et al: "MINLOC: Magnetic Field Patterns-Based Indoor Localization Using Convolutional Neural Networks," IEEE Access, vol. 8, XP011784254, pp. 66213-66227, Apr. 3, 2020.

European Search Report for European Application No. 20 30 6380 dated Jul. 22, 2021.

Gu Yanlei et al: "Integration of positioning and activity context information for lifelong in urban city area." Navigation: Journal of the Institute of Navigation, vol. 67, No. 1, XP056015859, pp. 163-179, Mar. 1, 2020.

Xie Ang et al: "Learning While Tracking: A Practical System Based on Variational Gaussian Process State-Space Model and Smartphone Sensory Data." 2020 IEEE 23rd International Conference on Information Fusion, XP033824779, pp. 1-7, Jul. 6, 2020.

\* cited by examiner

DEEP SMARTPHONE SENSORS FUSION FOR INDOOR POSITIONING AND TRACKING

CROSS-REFERENCE TO RELATED APPLICATIONS

This application claims the benefit of European Application No. EP20306380.5, filed on Nov. 13, 2020. The entire disclosure of the application referenced above is incorporated herein by reference.

FIELD

This disclosure relates to location systems and methods and more particularly to indoor positioning and tracking of portable electronic devices.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Location-based services may be used on portable electronic devices such as smartphones and tablet computers. Such services involve reliable positioning and tracking technologies for portable electronic devices. While satellite-positioning systems such as global positioning system (GPS) and Galileo provide reliable positioning outdoors, achieving comparable positioning accuracy in indoor environments, which may be fully enclosed or partially enclosed, is challenging and not provided by such systems. Indoor location-based services may enable relevant social and commercial benefits, so there is therefore a technological need to provide solutions for accurate indoor positioning.

Methods for smartphone-based indoor positioning have strengths and weaknesses under different conditions. For example, different sensors of smartphones may be used. Network sensors such as Wi-Fi sensors and Bluetooth sensors, may be employed to estimate signal strengths received at an indoor location from several access points distributed within the indoor environment. The received signal strengths (RSS) can be employed as RSS fingerprints to estimate the position of a portable electronic device.

For example, Wi-Fi fingerprinting may be used for smartphone-based indoor positioning. Positioning may be performed by matching a measured Wi-Fi fingerprint with a reference fingerprint collected before. The location associated with the closest matching reference fingerprint may be returned as a position estimate. The position estimate may be based on a nearest-neighbor matching which may be improved by using Gaussian processes that enable extrapolation to areas with no reference data.

To accurately determine positioning, the Wi-Fi fingerprints may be densely recorded and annotated with exact locations. The problem of scarcity of annotated radio may be addressed by employing an efficient fingerprint training method based on semi-supervised learning approaches. Another approach involves employing a semi-supervised method for localization with pseudo-labels for unlabeled data yielded from a Laplacian embedded regression least square approach. Yet another approach involving the lack of annotated radio data involves training a variational autoencoder for Wi-Fi-based position estimation.

Approaches for indoor positioning using Wi-Fi and Bluetooth data may be infrastructure-dependent. To achieve good performance, these systems may require a large number of access points with a large coverage. Moreover, severe RSS fluctuations may render inaccurate positioning results and lead to the localization error of 2-3 meters (m).

Another type of localization systems is infrastructure-free. This type includes positioning systems based on an inertial measurement unit (IMU) and a magnetometer. These sensors, however, have a cost advantage over other sensors that can be used for localization.

Pedestrian Dead Reckoning (PDR) systems utilize an accelerometer and a gyroscope of a mobile phone to track a user's path. PDR systems can provide a relative position only and require a starting position.

Elements containing iron elements (e.g., walls, pillars, windows) often create unique magnetic anomalies, which can be utilized for a magnetic field based approach.

PDR approaches may involve combining step detection, step length estimation, and user heading estimation from accelerometer, gyroscope, and magnetometer data streams. PDR can achieve accurate positioning over short distances but may be subject to drift over a long distance. PDR approaches may involve step detection, step length estimation, and heading determination. PDR approaches may involve heavy parameter tuning, because step length depends on the user's characteristics such as height and age or even for the same user may vary according to user activity.

Step detection algorithms, such as peak detection, flat zone detection, and zero crossing detection may involve heavy parameter tuning.

Another method involves an indoor positioning system that recognizes magnetic sequence patterns using a deep neural network. Features are extracted from magnetic sequences, and the deep neural network is used to classify the sequences based on patterns that are generated by nearby magnetic landmarks. However, the method fails when similar magnetic signatures are present in very different places. The location of a sensor cannot be accurately detected, since the same magnetic anomalies may be present in different locations caused by the same ferromagnetic objects.

Hence, both Wi-Fi-based positioning methods and PDR have limitations. To improve the accuracy of positioning, identification of landmarks based on specific sensor patterns may be used.

Accordingly, there is a need for an improved method of accurately estimating an absolute position of a portable electronic device from radio signal data and/or magnetic field data.

SUMMARY

Further areas of applicability of the present disclosure will become apparent from the detailed description, the claims and the drawings. The detailed description and specific examples are intended for purposes of illustration only and are not intended to limit the scope of the disclosure.

The present application involves a novel sensor fusion framework for fusing smartphone inertial sensors, magnetic field data, and Wi-Fi measurements for indoor positioning, which includes a novel approach of estimating an absolute position of a portable electronic device from magnetic field data.

In an embodiment, a computer-implemented method of estimating a position of a portable electronic device in an indoor environment from sensor data is provided. The computer implemented method includes generating at least one absolute position estimation of a portable electronic device, where generating each absolute position estimation is based on radio signal data and/or magnetic field data, where generating the at least one absolute position estimation is repeated at a first rate. The method further includes generating a displacement estimation of the portable electronic device, where generating the displacement estimation includes generating, by a neural network, the displacement estimation from inertial sensor data of the portable electronic device, where generating the displacement estimation is repeated at a second rate, which is different from the first rate. The method may further include determining an estimated position by updating the previously estimated position with at least one of the displacement estimation and the at least one absolute position estimation.

In further features, the second rate is higher than the first rate. The method may further include determining a sequence of estimated positions by updating a previously estimated position with a plurality of the repeated displacement estimation and at least one of the absolute position estimations.

In further features, generating the displacement estimation from the inertial sensor data includes converting the inertial sensor data to a graphical representation. The neural network may include at least one of a convolutional neural network (CNN), a bidirectional recurrent neural network (RNN) and a neural network including an attention layer.

In further features, the neural network includes feedforward networks to displacement regression and a feedforward network to determine an activity, where the activity is employed to correct the displacement regression to generate the displacement estimation.

In further features, generating the at least one absolute position estimation includes employing a trained variational autoencoder (VAE) to generate the absolute position estimation from the radio signal data.

In further features, a computer-implemented method of training a machine learning system for estimating a position from sensor data of a portable electronic device is disclosed. The method may include training a motion classifier with a subset of sensor training data to learn identifying a user activity, where the training data includes inertial sensor data that has been captured by a user carrying the portable electronic device along a trajectory, training a landmark classifier for detection of landmarks from the sensor training data, and generating pseudo-labels for annotating the sensor training data. Generating the pseudo-labels includes employing a user activity identified by the motion classifier and landmark positions identified by the landmark classifier, where generating the pseudo-labels comprises, when the user activity identified by the motion classifier indicates that the user was in motion, interpolating positions between two landmark positions. The method may further include training a neural network with the annotated training data.

In further features, training the landmark classifier includes estimating orientation vectors from the inertial sensor data and employing a change in the orientation vectors as indicating a landmark position.

In further features, a computer-implemented method of estimating an absolute position of a portable electronic device from magnetic field data includes creating graphical representations based on magnetic field data of a sensor of a portable electronic device, and determining an absolute position of the portable electronic device based at least in part on the graphical representations using a neural network. The magnetic field data includes a time series of magnetic field values. The neural network includes one or more convolutional layers and a multichannel input to the one or more convolutional layers.

By determining an absolute position of the portable electronic device based at least in part on the graphical representations using a neural network including one or more convolutional layers and a multichannel input to the one or more convolutional layers, an improved method of determining an absolute position of the portable electronic device in an accurate manner is provided.

In further features, the creating graphical representations based on magnetic field data includes selecting a subset of magnetic field values of the time series of magnetic field values, and transforming the subset of magnetic field values or a projection of the subset of magnetic field values into one or more two-dimensional images. The graphical representations may comprise at least one of a recurrence plot, RP, a Gramian Angular Field, such as a Gramian Angular Summation Field, GASF, and/or a Gramian Angular Difference Field, GADF, and a Markov Transition Field, MTF.

In further features, the neural network may include one or more recurrent layers, such as one or more gated recurrent units. The one or more recurrent layers may follow the one or more convolutional layers. The neural network may be trained based on characteristics of the earth magnetic field in a building to determine the position of the sensor in the building. A first graphical representation may be created in accordance with a first method, and a second graphical representation, created in accordance with a second method different from the first method, are inputted simultaneously in the multichannel input to the one or more convolutional layers, where the first graphical representation and the second graphical representation are obtained from a same set of magnetic field value. The first and the second method may be methods for creating a recurrence plot, RP, a Gramian Angular Field, such as a Gramian Angular Summation Field, GASF, a Gramian Angular Difference Field, GADF, or a Markov Transition Field, MTF.

In further features, the method further includes initializing the neural network with one or more starting positions obtained from a positioning system, such as an indoor positioning system. For testing, the neural network may be initialized with a noisy ground truth point or position.

In further features, the method may further include generating, by the sensor, the magnetic field data. The determining an absolute position of the portable electronic device may include inputting, in the neural network, a set of visual representations, associated with a first timestamp, of the visual representations and at least one of: (i) one or more previously determined positions, (ii) previously determined feature vectors, and (iii) one or more sets of visual representations associated with respective timestamps different from the first timestamp.

In a further embodiment, a computer-readable storage medium having computer-executable instructions stored thereon is provided. When executed by one or more processors, the computer-executable instructions perform the method of estimating an absolute position of a portable electronic device described above and herein.

In further features, an apparatus including processing circuitry is provided. The processing circuitry is configured to perform the method of estimating an absolute position of a portable electronic device described above and herein.

In a feature, a computer-implemented method of determining a position of a portable electronic device in an indoor environment includes: at a first rate, updating an absolute position of a portable electronic device within the indoor environment based on at least one of radio signal data and magnetic field data captured using the portable electronic device; at a second rate that is different than the first rate, selectively updating an estimated displacement of the portable electronic device within the indoor environment, the updating the estimated displacement comprising generating an estimated displacement, by a neural network module, based on inertial sensor data of the portable electronic device; and determining a present position of the portable electronic device within the indoor environment by updating a previous position based on at least one of (a) the estimated displacement and (b) the absolute position.

In further features, generating the estimated displacement based on the inertial sensor data includes converting the inertial sensor data to a graphical representation and generating the estimated displacement based on the graphical representation.

In further features, the neural network module includes at least one of a convolutional neural network, a bidirectional recurrent neural network, and a neural network.

In further features the computer-implemented method further includes, using the neural network module, determining an activity classification based on the inertial sensor data and generating the estimated displacement further based on the activity classification.

In further features, determining the activity classification includes determining the activity classification using a feed-forward network of the neural network module.

In further features, the activity classification is selected from the group consisting of (a) moving and (b) not moving.

In further features, generating the estimated displacement includes setting the estimated displacement to zero displacement when the activity classification is set to (b) not moving.

In further features, updating the absolute position includes generating the absolute position based on the radio signal data using a variational autoencoder trained to generate the absolute position from radio signal data.

In further features, the second rate is faster than the first rate.

In further features, the updating the absolute position includes updating the absolute position based on the magnetic field data.

In further features, updating the absolute position includes: generating graphical representations based on the magnetic field data, wherein the magnetic field data includes a time series of magnetic field values; and determining the absolute position of the portable electronic device, using a neural network module, based on the graphical representations In further features, the neural network module includes one or more convolutional layers and a multichannel input to the one or more convolutional layers.

In further features, the generating the graphical representations includes: selecting a subset of magnetic field values of the time series of magnetic field values; and generating one or more two-dimensional images based on the subset of magnetic field values, where determining the absolute position includes determining the absolute position based on the one or more two-dimensional images.

In further features, the graphical representations include at least one of a recurrence plot, a Gramian Angular Summation Field, a Gramian Angular Difference Field, and a Markov Transition Field.

In further features, the graphical representations include at least two different ones of a recurrence plot, a Gramian Angular Summation Field, a Gramian Angular Difference Field, and a Markov Transition Field, wherein the at least two different ones are generated based on the magnetic field values.

In further features, the neural network module includes one or more recurrent layers, and wherein the one or more recurrent layers receive input from the one or more convolutional layers.

In further features, the neural network module is trained based on characteristics of the magnetic field of the Earth measured within the indoor environment.

In further features, the computer-implemented method further includes initializing the neural network module with a starting position of the portable electronic device.

In a feature, a computer-implemented method of training a neural network module to estimate a position of a portable electronic device within an indoor environment includes: training, with sensor training data, a motion classifier module of the neural network module to determine a present user activity, where the sensor training data includes inertial sensor data captured while a portable electronic device moved along a path within one or more indoor environments; training, with the sensor training data, a landmark classifier module of the neural network module to detect landmarks within one or more indoor environments; generating labels and annotating the sensor training data with the labels, the generating the labels including generating the labels based on user activities determined by the motion classifier and landmarks detected by the landmark classifier; and further training the neural network module based on (a) the sensor training data and (b) the labels, respectively.

In further features, the computer-implemented method further includes by the landmark classifier module: estimating orientation vectors from the inertial sensor data; and detecting a landmark based on a change in the orientation vectors.

In a feature, a computer-implemented method of determining an absolute position of a portable electronic device within an indoor environment from magnetic field data includes: generating graphical representations based on magnetic field data including a time series of magnetic field values, the magnetic field data generated by a sensor of the portable electronic device within the indoor environment; and determining an absolute position of the portable electronic device within the indoor environment based on the graphical representations using a neural network module, the neural network module including: one or more convolutional layers; and a multichannel input to the one or more convolutional layers.

In further features, the generating graphical representations based on the magnetic field data includes: selecting a subset of magnetic field values of the time series of magnetic field values, and transforming one of (a) the subset of magnetic field values and (b) a projection of the subset of magnetic field values into (c) one or more two-dimensional images; and generating the graphical representations based on the one or more two-dimensional images.

In further features, the graphical representations include at least two different ones of a recurrence plot, a Gramian Angular Summation Field, a Gramian Angular Difference Field, and a Markov Transition Field, wherein the at least two different ones are generated based on the magnetic field values.

In further features, the neural network module includes one or more recurrent layers that receive input from the one or more convolutional layers.

In further features, the computer-implemented method further includes initializing the neural network module with one or more starting positions obtained from a positioning system.

In further features, the neural network module is trained based on characteristics of the magnetic field of the Earth within the indoor environment.

The following detailed description and accompanying drawings provide a more detailed understanding of the nature and advantages of the present invention.

BRIEF DESCRIPTION OF THE DRAWINGS

The present disclosure will become more fully understood from the detailed description and the accompanying drawings, wherein.

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

In the drawings, reference numbers may be reused to identify similar and/or identical elements.

DETAILED DESCRIPTION

Described herein are systems and methods for indoor localization. For purposes of explanation, numerous examples and specific details are set forth in order to provide a thorough understanding of the described examples. Examples as defined by the claims may include some or all of the features in these examples alone or in combination with other features described below, and may further include modifications and equivalents of the features and concepts described herein. The illustrative examples will be described with reference to the drawings wherein elements and structures are indicated by reference numbers. Further, where an embodiment is a method, functions and elements of the method may be combinable in parallel or sequential execution. As far as they are not contradictory, all examples described below can be combined with each other.

Aspects of the present disclosure address the problem of indoor positioning and tracking with a novel sensor fusion framework, using smartphone inertial sensors and Wi-Fi measurements. A deep learning approach to pedestrian dead reckoning (PDR) is proposed. The present application further involves systems and methods for generating a large annotated data set for training a neural model for PDR by detecting user motion states and landmarks in raw sensors data and employing these classifications to generate pseudo-labels.

The systems and methods described herein have been evaluated to the offline setting of the IPIN 2019 Indoor Localization Competition: Track 3—Smartphone-based database, which involves the task of recreating a path walked by a person holding a conventional modern smartphone, based on the readings of the smartphone's sensors.

Further aspects of the present disclosure address the problem of indoor localization using magnetic field data provided by sensors, such as mobile phone sensors. Magnetic anomalies in indoor environments can be created by different ferromagnetic objects. In a feature, changes of the Earth's magnetic field due to indoor magnetic anomalies can be captured and transformed in multivariate time series. A number of techniques can be used to convert temporal patterns into visual patterns. For example, Recurrence plots, Gramian Angular Fields, and Markov Transition Fields can be used to represent magnetic field time series as image sequences. In a feature, a landmark-based classification can be complemented with deep regression on a sensor position or the associated user position by combining convolutional and recurrent layers. In a feature, an estimation of the neural network module can be bootstrapped with noisy starting estimation.

Examples of the present invention have been tested on other datasets, such as the MagPie dataset for evaluating magnetic field-based localization methods.

Figure 1:
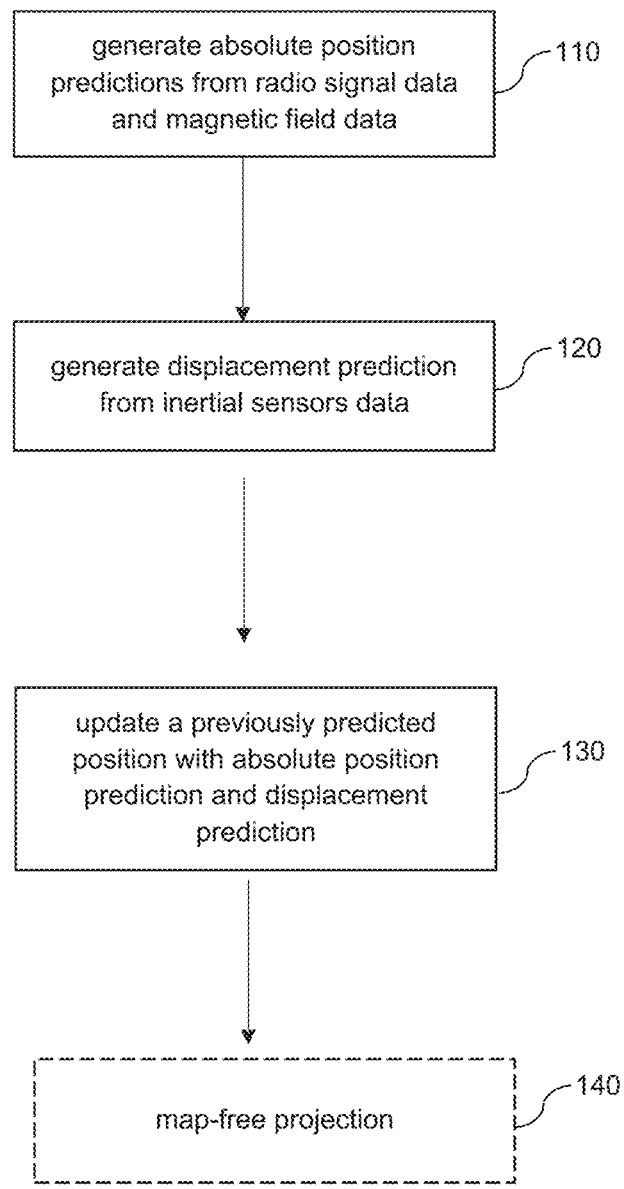
FIG. 1 illustrates a flowchart illustrative of a method for indoor localization.

FIG. 1 illustrates a flowchart of an example method 100 for indoor localization. Method 100 can be employed for predicting/estimating a position of a portable electronic device, such as a smartphone (also referred to as a mobile phone), a tablet device, or another type of computing device in an indoor environment, from sensor data provided by built-in sensors of the portable electronic device. Examples of indoor environments include houses, warehouses, buildings, etc.

Method 100 includes at 110 generating estimations for an absolute position of the portable electronic device from at least one of radio signal data and magnetic field data or from physical environment data sensed by dedicated sensors of the portable electronic device. The portable electronic device may include a Wi-Fi sensor configured to capture radio (Wi-Fi) signals communicating using a Wi-Fi communication protocol, such as defined by a section of the Institute of Electrical and Electronics Engineers (IEEE) 802.11 standard. The Wi-Fi sensor is configured to generate RSS data from radio access points in the proximity, such as Wi-Fi access points. The time interval for collection of Wi-Fi data may be, for example, once every 4 seconds or another suitable frequency.

Generating estimations of the absolute position from radio signal data may be repeated with a first rate, and generating estimations for the absolute position from magnetic field data may be repeated with a second rate, which may be larger than the first rate.

In various implementations, generating an absolute position estimation from Wi-Fi data may be based on a semi-supervised learning paradigm, which uses a combination of low-cost collected non-annotated Wi-Fi data and a limited set of annotated Wi-Fi data. In various implementations, a method based on a variational autoencoder (VAE) may be used to generate an absolute position estimation, such as described in European Patent Application Publication EP 3798918 A1 and US Patent Application Publication 2021/0097387 A1. The VAE encoder/decoder architecture involves a VAE encoder mapping obtained RSS data into a latent variable and acts as a regressor of available labeled data. The VAE decoder functions as a regularizer on labeled and unlabeled data. A classification neural network may be employed to generate an estimated location based on the latent variable.

Additionally or alternatively, generating the absolute position estimation may be based on employing magnetic field data, as explained in further detail below with reference to FIGS. 8 to 10B, 12, and 13.

Method 100 further includes at 120 generating a displacement estimation employing inertial sensors data input to a trained neural network. Inertial sensors data may be provided by the portable electronic device's internal measurement unit (IMU) sensors at predetermined rate, allowing the trained neural network to generate local displacement estimations $\Delta x$, $\Delta y$ frequently (e.g., at the predetermined rate). The predetermined rate may be larger than the first rate of repeating estimating the absolute position from radio signal data and the second rate of estimating the absolute position from magnetic field data.

In embodiments, 120 may include converting the inertial sensors data to a graphical representation, which is inputted to the trained neural network to generate horizontal displacement estimations $\Delta x$ and $\Delta y$. A vertical displacement estimation $\Delta z$ may be generated based on barometer (ambient air pressure) sensor data. For example, the vertical displacement may increase as the barometric pressure decreases and vice versa.

In various implementations, the neural network that determines the horizontal displacement estimation may include a convolutional neural network (CNN), or a recurrent neural network (RNN). In various implementations, the graphical representation of the sensors data may be based on building a recurrence matrix.

Method 100 further includes at 130 estimating a position of the portable electronic device by updating a previously (e.g., last) estimated position with the displacement estimation and/or the absolute position estimations. Because the absolute position estimations may be available at a relatively slower rate, while the displacement estimation is usually generated at a faster rate, updating the estimated position with the displacement estimations may be performed at a faster rate, while updating the estimated position with the absolute position estimations may be performed at a slower rate. A sequence of estimated positions may be determined by fusing a plurality of displacement estimations with at least one absolute position estimation. Employing at least one absolute position estimation in addition to the displacement estimations may improve accuracy because the absolute position estimation may correct for systematic drift of the estimation arising from summing a plurality of displacement estimations.

In various implementations, a Kalman filter may fuse the absolute position estimation and the displacement estimation to generate an estimated position. Employing a Kalman filter based approach may be suitable for resource-limited smartphones, because this approach is computationally lightweight. In various implementations, a Kalman filter may perform sensor fusion and combine PDR estimations generated at a high rate with absolute position estimations generated at relatively low rate. In various implementations, a Kalman filter may be employed as described in Chen, "Fusion of Wi-Fi, smartphone sensors and landmarks using the Kalman filter for indoor localization", Sensors, 15(1): 715-732, 2015, which is incorporated in its entirety.

Method 100 optionally includes at 140 applying a map-free projection to the location estimated at 130. 140 may correct a location estimated at 130 that lies outside of the indoor location to a location within the indoor location, for example, by projecting the estimated location to a convex hull of known indoor locations, as explained in further detail below.

Figure 2:
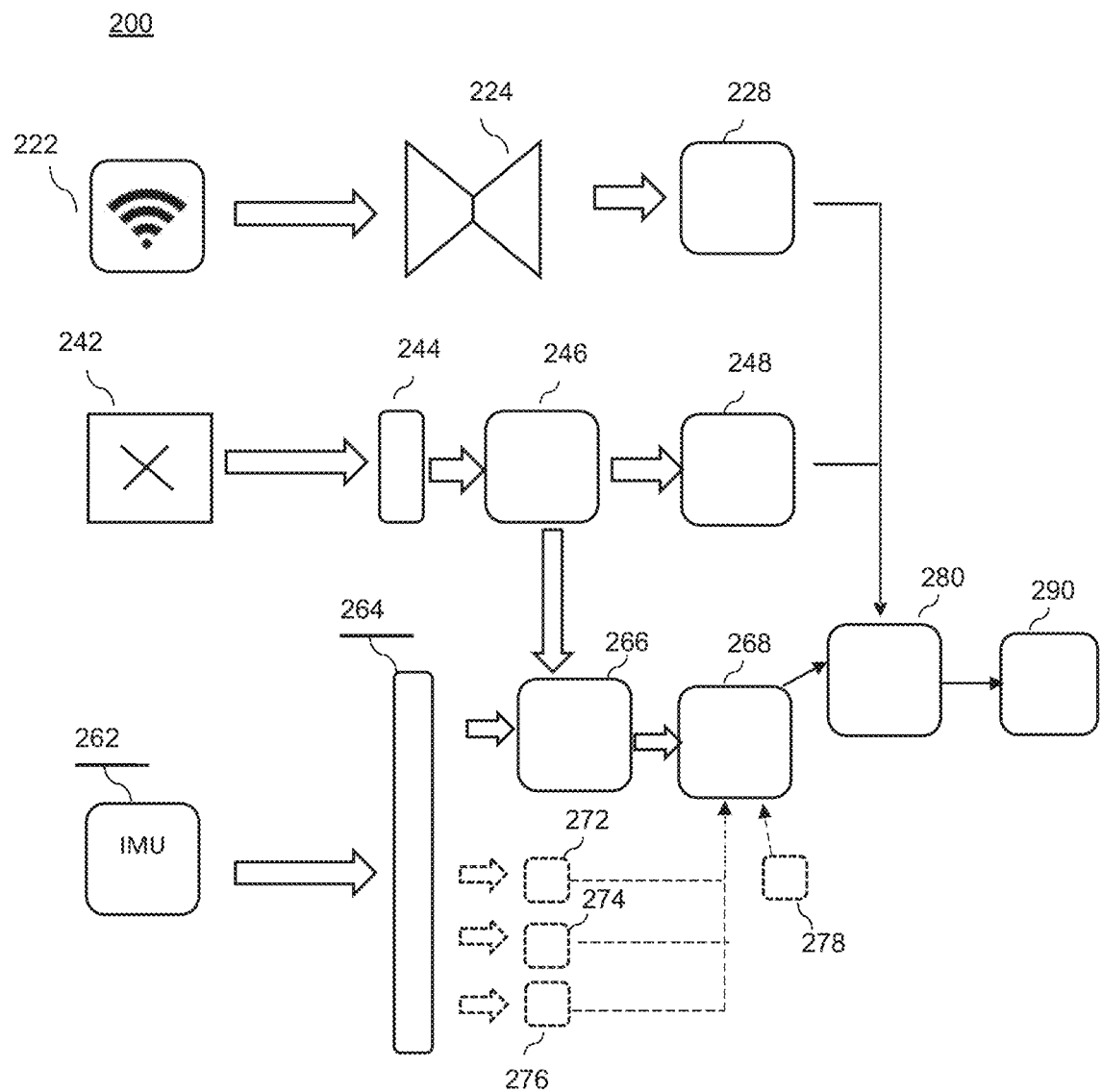
FIG. 2 illustrates an example system for indoor localization.

FIG. 2 illustrates a system 200 configured to perform the method 100. System 200 uses sensors data provided by sensors 222, 242, and 262. Sensor 222 may be a sensor for radio signal data, such as a Wi-Fi sensor providing RSS data. Sensor 242 may be a magnetometer of the portable electronic device configured to measure magnetic field data at the present location of the portable electronic device. Sensor 262 may include one or more IMU sensors, such as an accelerometer and a gyroscope, such as of the portable electronic device.

Magnetic field data provided by magnetometer 242 may be pre-processed by a preprocessor module 244. Preprocessed magnetometer data may be provided to a transformation module 246 configured to generate a graphical representation of the magnetic field data such as by generating a recurrent plot. The graphical representation may be provided to a neural network module 248. As explained in further detail below, the neural network module 248 may include a multichannel CNN followed by an RNN. The neural network module 248 may be configured to generate an absolute location estimation as explained below with reference to FIGS. 10A and 10B. Because magnetometers of portable electronic devices may be configured to generate magnetic field data at first rate, the pipeline of magnetometer 242, the pre-processing module 244, the transformation module 244, and the neural network module 248 may provide an absolute position estimation at the first rate.

IMU sensors 262 may provide inertial sensor data at a second rate that is higher than the first rate. A preprocessing module 264 may pre-process the inertial sensor data. After pre-processing, the data stream may be transformed to a graphical representation by a transformation module 266. As explained in further detail below, transformation module may construct a graphical representation from data in a sliding window running over the IMU data stream. The graphical representations of the IMU data stream may be provided to a neural network module 268 trained to infer from the image-framed input a displacement estimation corresponding to an estimation of a change in the user's position. As explained in further detail below, the neural network module 268 may include a CNN or an RNN. In embodiments, the transformation module 266 may transform sensors data in a raw mode into a graphical representation from the sensor's data values such as by translating a data value to a color value of a pixel and concatenating the pixels for all sensor dimensions. Alternatively, the transformation module 266 may form a recurrent matrix and build the graphical representation from the sensor data.

The system 200 also includes components configured to generate an absolute position estimation from radio signal data such as Wi-Fi RSS data. The network sensor 222 may be configured to collect radio signal data at third rate that is less than the first rate. The radio signal data may be inputted to a pipeline of the neural network modules 224 and 228 which generate an absolution position estimation according to a Wi-Fi fingerprinting positioning method. In various implementations, the neural network module 224 may include a VAE configured to generate a latent variable based on the radio signal data, and the neural network module 228 may include a classification neural network configured to determine an absolute position estimation from the latent variable of the VAE, such as disclosed in European Patent Application Publication EP 3798918 A1 and US Patent Application Publication 2021/0097387 A1, which are incorporated in their entirety. Employing a VAE may reduce the need for labeled data, because it allows the training date to include a small amount of labeled data (10-15%) and a larger amount of non-annotated Wi-Fi observation data to training an accurate estimator of indoor localization.

Sensor fusion module 280 may fuse the displacement estimation of the pipeline of the IMU sensors 262, the transformation module 266, and the neural network module 268, generated at one or more specified rates (e.g., a high rate), with the absolute position estimation generated by the pipeline of the magnetometer 242, the transformation module 244, and the neural network module 248, and/or the absolute position estimation generated by the pipeline of the network sensor 222, and the neural network modules 224 and 228. In comparison with the high rate of estimation of the pipeline 262, 264, 266, and 268, and the pipeline 242, 244, and 248, the pipeline 222, 224, 228 generates estimations at relatively low rate, so that the sensor fusion module 280 employs displacement estimation to update a position frequently, and employs the one or more absolute position estimations relatively less frequently. The update of the position employing the one or more absolute position estimations can correct drift due to accumulation of errors in displacement estimation.

Under some circumstances, estimations generated by the sensor fusion module 280 may lie outside a target space, e.g., outside of the building. In this regard, accessing a location map of the target space (indoor environment) and correcting the estimations of the sensor fusion module 280 may be performed (e.g., by the sensor fusion module 280) when the estimation is outside of the indoor environment according to the location map. To provide a system that is more generic and map-independent, the present application involves applying a map-free projection of the estimation generated by the sensor fusion module 280.

A projection module 290 is configured to calculate a weighted neighborhood estimation in which a top matching number Nr of neighbors in the available annotated training set are considered. Nr may be an integer greater than 1. The absolute position estimation is generated by the projection module 290 as a weighted sum of the positions of the identified Nr nearest neighbors. The weighted sum employs weights that are calculated by the projection module 290 based on an inverse of distances between the estimation and corresponding neighbors, hence defining a convex hull defined by the Nr neighbors.

FIG. 2 also illustrates, employing dashed lines, data flow and modules used to train the neural network module 268. Training data usually contain only a small number of ground truth annotations 278. During training, pre-processed data is provided to a landmark detector module 272, an activity classifier module 274, and a speed and stride estimator module 276. In a pre-training step, the landmark detector module 272 may be trained to determine a landmark from the pre-processed sensor data. Landmarks may generally refer to direction changes such as when a user reaches a corner of a corridor and turns to continue walking in the corridor. The landmark detector module 272 may employ orientation vectors to detect orientation changes. The landmark detector module 272 may correlate orientation data with other sensors data and/or landmark ground-truth to classify the presence of a landmark. Orientation vectors may be estimated by the landmark detector module 272 from accelerometer, gyroscope, and magnetometer data. In various implementations, the landmark detector module 272 includes a random forest model.

The activity classifier module 274 may be trained to classify the IMU sensor data to infer whether a user, carrying the portable electronic device used for generating the training data, was walking or was standing still. The activity classifier module 272 may indicate whether, based on the IMU sensor data, the user is walking or standing still (not walking).

Further, during training, the speed and stride estimator module 276 may be trained to estimate a speed and a stride of the user from sensor data. The output of landmark detector module 272, the activity classifier module 274, and the speed and stride estimator module 276, are used generate pseudo-labels, as will be explained in further detail below. Generating pseudo-labels allows overcoming the scarcity of annotations 278, so that available training sensors data collected by the IMU sensors 262 may be annotated with the generated pseudo-labels to generate fully annotated training data for training the neural network module 268.

Figure 3:
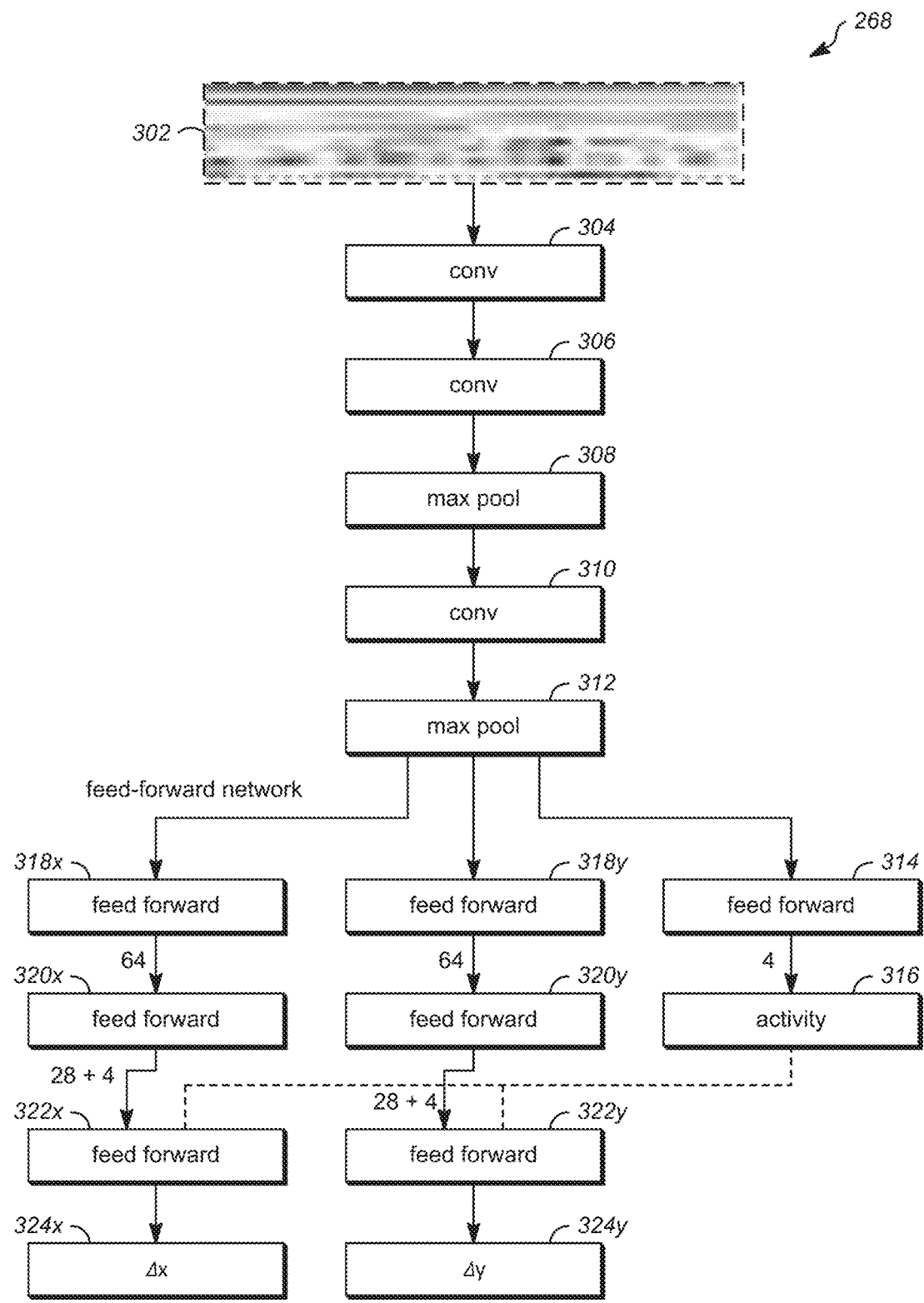
FIG. 3 illustrates a functional block diagram of a neural network for PDR.

FIG. 3 illustrates an implementation of the neural network module 268 for PDR where the neural network module 268 includes a CNN. The neural network module 268 may receive a graphical representation 302 obtained from sensor data. The graphical representation 302 may be processed by convolution layers 304 and 306, followed by max-pooling layer 308, convolution layer 310, and max-pooling layer 312. The output of module max-pooling layer 312 may be provided to feed-forward layers 318$x$, 318$y$, and 314. The output of feed-forward layer 314 may be employed to generate an activity classification 316 (e.g., walking or standing still). The output of feed-forward layers 318$x$ and 318$y$ may be processed by respective pipelines of feed-forward layers 320$x$, 320$y$, followed by feedforward layers 322$x$, 322$y$, respectively, to generate displacement estimations 324$x$, 324$y$, that correspond to displacement estimations $\Delta x$ and $\Delta y$ for displacement of the portable electronic device relative to a previously determined position.

The implementation of the neural network module 268 of FIG. 3 involves three convolution layers and two max-pooling layers, followed by fully connected layers. The max-pooling layers improve the overall accuracy of the estimations generated by the CNN. Furthermore, the convolution kernels, in convolution layers 304, 306, and 310, vary in function of the input image size. The pooling layers 308 and 312 extract features of the convolution layer output by reducing the number of rows and columns of the image. In embodiments, the max-pooling layers 308 and 312 involve a two-by-two filter with stride 2 to store the maximum value of the two-by-two subsections of the image. At the final stage of CNN, the fully connected layers 322x and 322y with softmax activation function calculate the output of the CNN.

Employing CNNs as the neural network module 268 for PDR allows correlations to be identified between sensors. In particular, CNNs can exploit the local dependency characteristics inherent in multimodal time series sensor data. Furthermore, employing CNNs leverages the translational invariant nature of movement.

Figure 4:
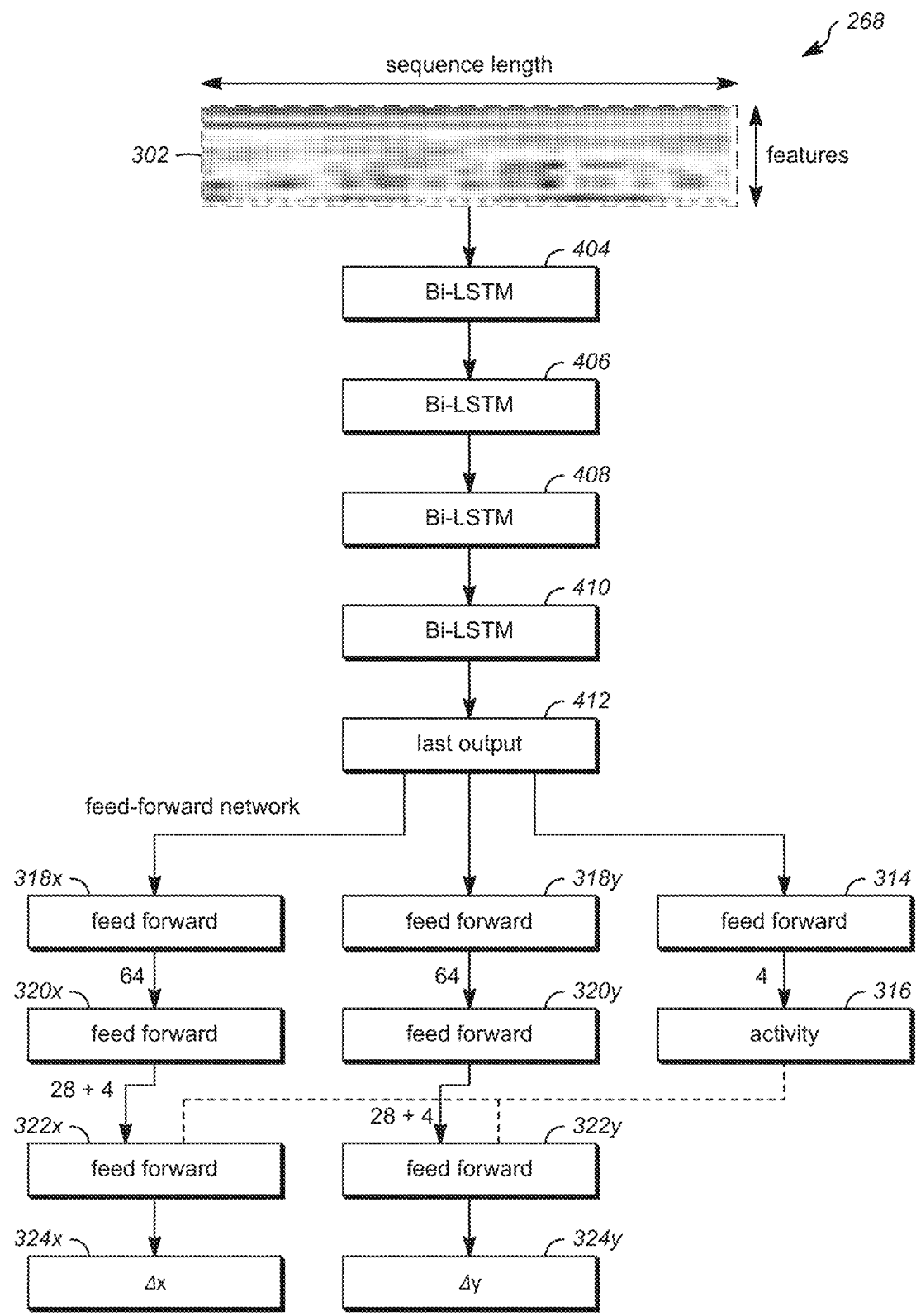
FIG. 4 illustrates a functional block diagram of a neural network for PDR.

FIG. 4 illustrates an alternative embodiment of the neural network module 268 for PDR. A graphical representation 302 of the sensor data may be processed by a pipeline of bi-LSTM (long short term memory) layers 404 to 410. The last output layer 412 may be configured to provide output to the feed-forward layers 314, 318x, and 318y, that are configured to generate estimated displacements 324x, 324y, as discussed above with the example of FIG. 3.

The example neural network module 268 of FIG. 4 includes RNNs which process sequences of values and capture long distance interdependencies in the input stream. Because RNNs can pass information from one time step to the next, the RNNs are configured to capture information about previous values in the input stream. In particular, the RNNs capture temporal patterns in time series data of IMU sensor data. The RNN based example of FIG. 4 involves feeding the time series data in a bidirectional manner so that the (bi directional) bi-LSTM layers are trained to recognize patterns in both temporal directions. LSTM networks/layers overcome the vanishing and exploding gradient problems of RNNs, while also efficiently learning long-range dependencies.

Figure 5:
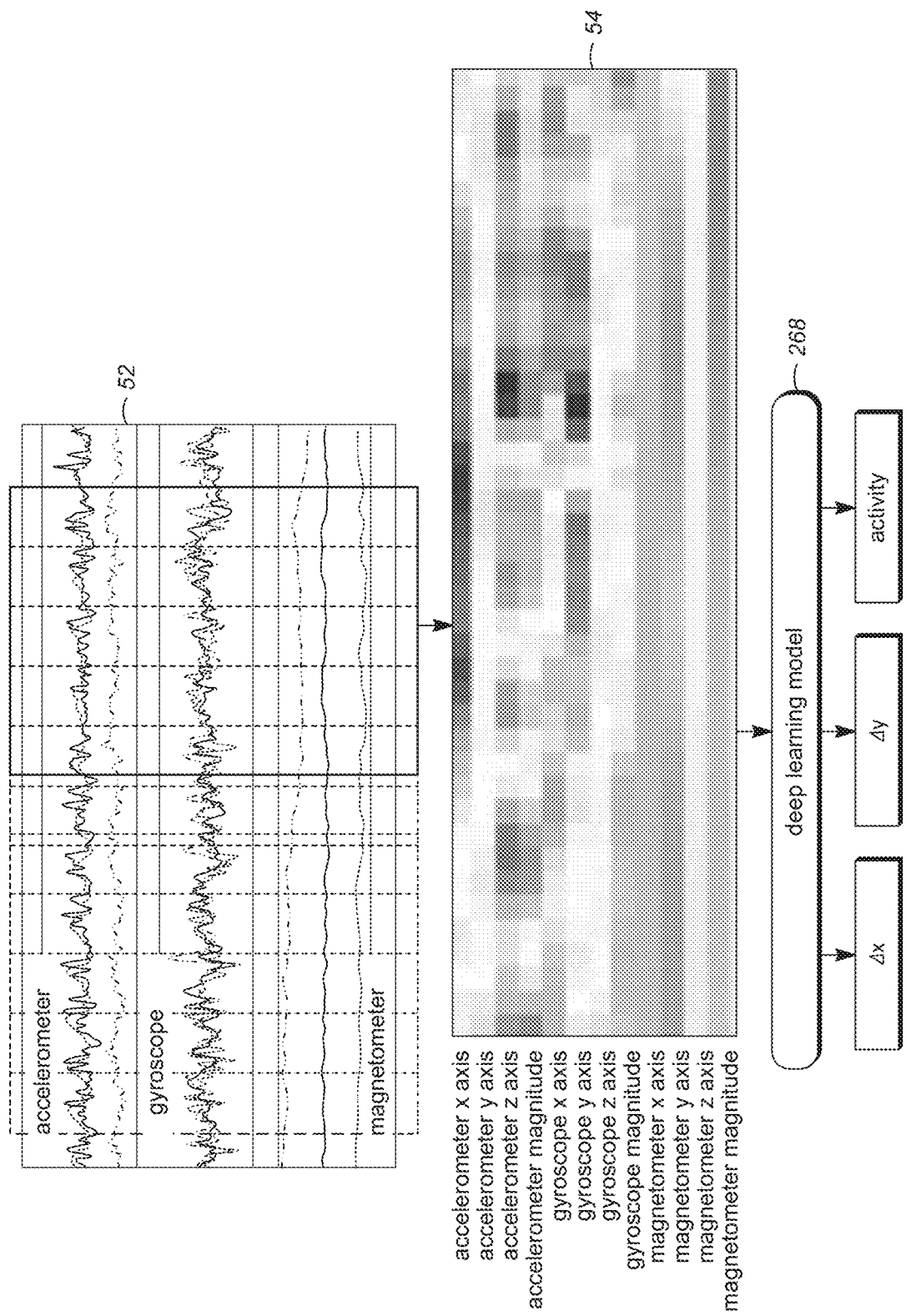
FIG. 5 illustrates an example of transforming sensors data to a graphical representation.

FIG. 5 illustrates graphical representations generated from sensor data. FIG. 5 displays graphs of accelerometer, gyroscope, and magnetometer data values. Each of the accelerometer, gyroscope, and magnetometer provide data values for the respective values along the X, Y, Z axes. The data values illustrated in line plots 52 are transformed to graphical representation 54. In the illustrated embodiment, data values are used to determine a color saturation of a pixel of graphical representation 54, producing a row of pixels for each sensors data dimension. In other words, the color saturation of a pixel of the graphical representation 54 is determined based on a respective data value.

In various implementations, a positive data value may determine a color saturation of the pixel in a first color dimension, such as an red green blue (rgb) color dimension, and a negative data value may determine a color saturation of the pixel in a second color dimension, such as a different rgb color dimension. By concatenating all sensor's data, a graphical representation with dimension $\Delta t \times d$ is generated, wherein $\Delta t$ is the size of the considered sliding time window. The width of $\Delta t$ determines the width of each data point for input to the neural network module 268. In various implementations, before producing the graphical representation 54, the sensor data is down-sampled, such as to a frequency of 50 Hertz (Hz) or another suitable frequency sufficient to characterize a user's displacement. In various implementations, the window width may correspond to 1 second, so that each data point of graphical representation 54 has fifty columns, $\Delta t=50$.

FIG. 5 illustrates an embodiment with a total of twelve features corresponding to three sensors, an accelerometer, gyroscope, and magnetometer, and for each sensor one row for each axis and one row for the magnitude calculated from the combined X, Y, and Z values. As has been explained in detail above, the neural network module 268 may include one regression branch that estimates a displacement $\Delta x$, $\Delta y$ and a classification branch that determines a user activity. The example of FIG. 5 corresponds to a raw data mode where the neural network module 268 is input sensor data values (e.g. accelerometer and gyroscope data values from the transformation module 266, and magnetometer data values from the transformation module 246) directly translated to the graphical representation 54. Alternatively, graphical representation may be formed based on a recurrence matrix.

Figure 6:
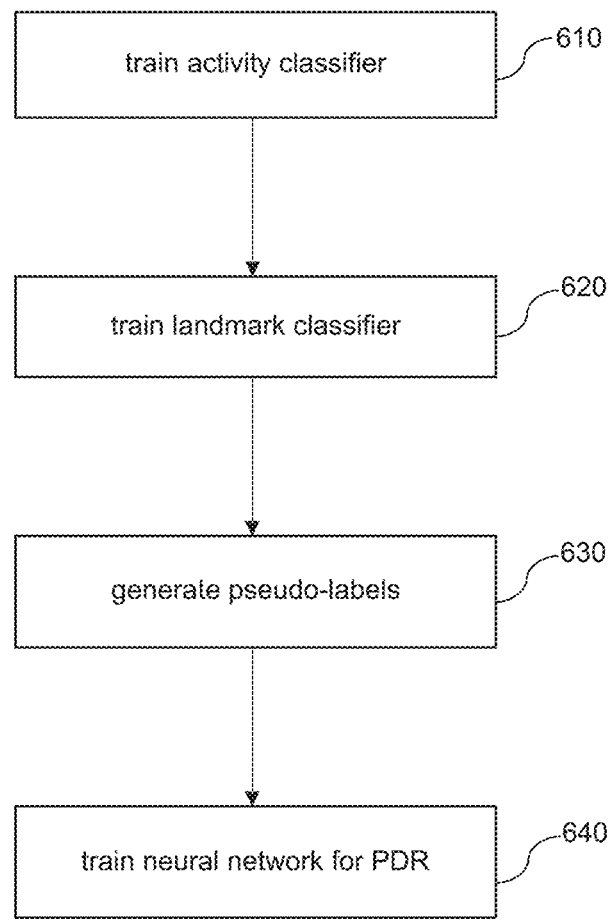
FIG. 6 illustrates a process flow diagram of a method for training a neural network for Pedestrian Dead Reckoning (PDR)

FIG. 6 illustrates method 600 for training a neural network for PDR. Method 600 may perform the training using training data captured by a user carrying the portable electronic device, which records sensor readings. The training data includes recorded sensor readings and annotations for a limited number of landmarks. Method 600 allows annotating the raw sensor data generated at a high rate with pseudo-labels. Generating pseudo-labels is based on pre-training for the tasks of user activity classification and landmark detection.

Method 600 includes at 610 training an activity classifier to distinguish between the user walking and the user standing still using the training data. Further, method 600 includes at 620 training a landmark classifier using the training data. The landmarks provided with the data may refer to direction changes of the user trajectory during capturing the training data. Training according to the method 600 may assume that there are no changes in orientation on the user's trajectory between two consecutive landmarks, so that the user's trajectory between the points corresponding to the landmarks is a straight line.

The activity classifier and the landmark classifier may be trained to achieve high accuracy, which ensures high accuracy of the generated pseudo-labels.

The method 600 at 630 includes generating pseudo-labels based on this assumption on user motion between landmarks (e.g., straight line movement). However, the user's speed along the trajectory can vary due to an obstacle such as a door or other people encountered on the trajectory. Generating the pseudo-labels includes determining the speed along the trajectory between landmarks by obtaining a number of steps from data from the accelerometer. The speed may be adjusted based on distance between consecutive landmarks and their corresponding time stamps. The assumption that the user's trajectory is along a straight line between any two consecutive landmarks is true in most indoor environments, which often involve buildings with long corridors/hallways/walkways. Hence, the error associated with this assumption is limited to situations such as user choices between multi-door passages and the width of corridors.

The method 600 further includes at 640 training a neural network module for PDR to generate displacement estimations. Training 640 the neural network module for PDR includes enriching (e.g., adding to) the training set with the generated pseudo-labels and includes training the neural network module using the enriched training set. Training the neural network for PDR includes training for regression and training for activity estimation/classification. Training for regression is to produce accurate estimated displacements $\Delta x$, $\Delta y$. Training the neural network module for PDR may include training to minimize a cross-entropy loss $Loss_{ce}$, while training the neural network module for PDR for regression may involve minimizing an L2 loss over a set of 2D (two dimensional) points according to $$Loss_{regr} = \frac{1}{N}\sum_{n=1}^{N}\|(\Delta\widehat{x_n},\Delta\widehat{y_n}) - (\Delta x_n, \Delta y_n)\|,$$

where $\Delta x_n$, $\Delta y_n$ is yielded from annotation data and $\Delta\widehat{x_n}$, $\Delta\widehat{y_n}$ is the displacement estimation. Regarding training the neural network module for PDR, an Adam optimizer with learning rate $10^{-3}$ may be used. The total training and validation losses may be calculated according to $$Loss_{total} = Loss_{regr} + \alpha Loss_{ce},$$

where $\alpha$ is a trade-off between regression and activity estimation.

Figure 7A:
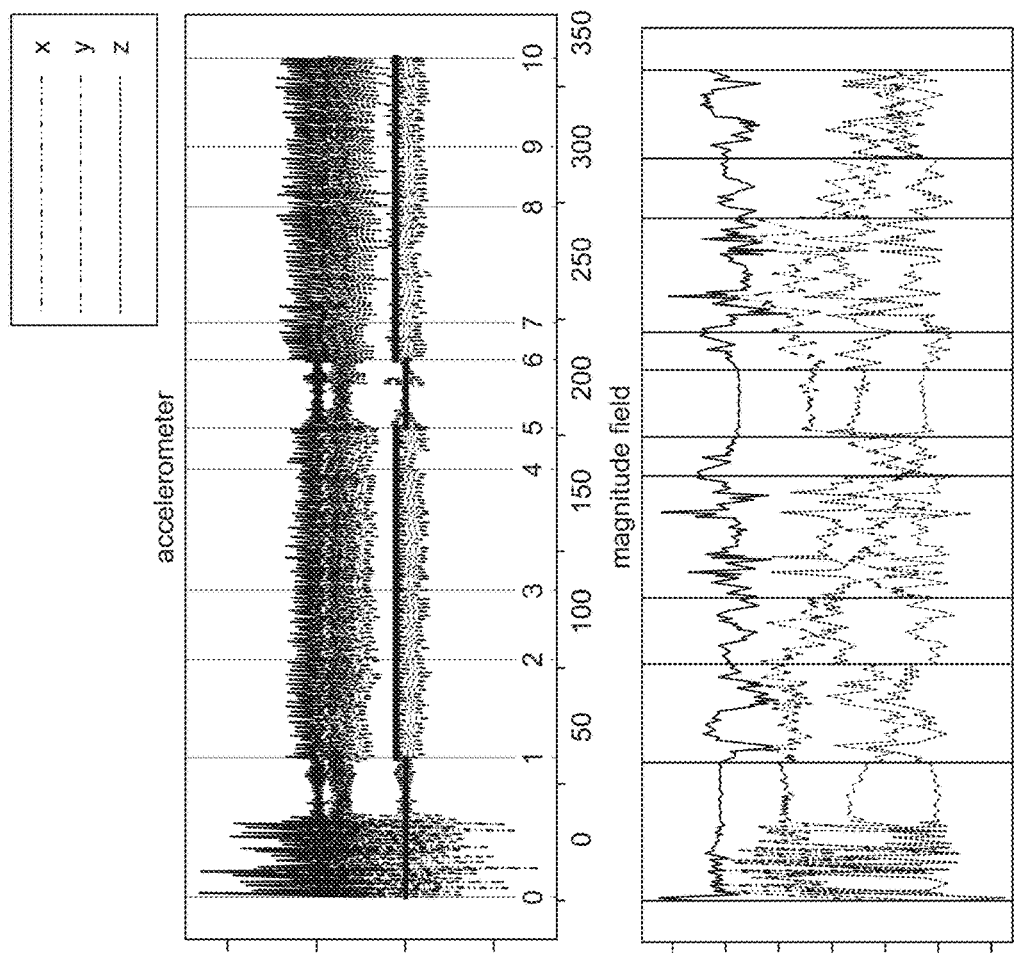
FIGS. 7A and 7B illustrate sensors data for an example training path employed for training a neural network for PDR.
Figure 7A:
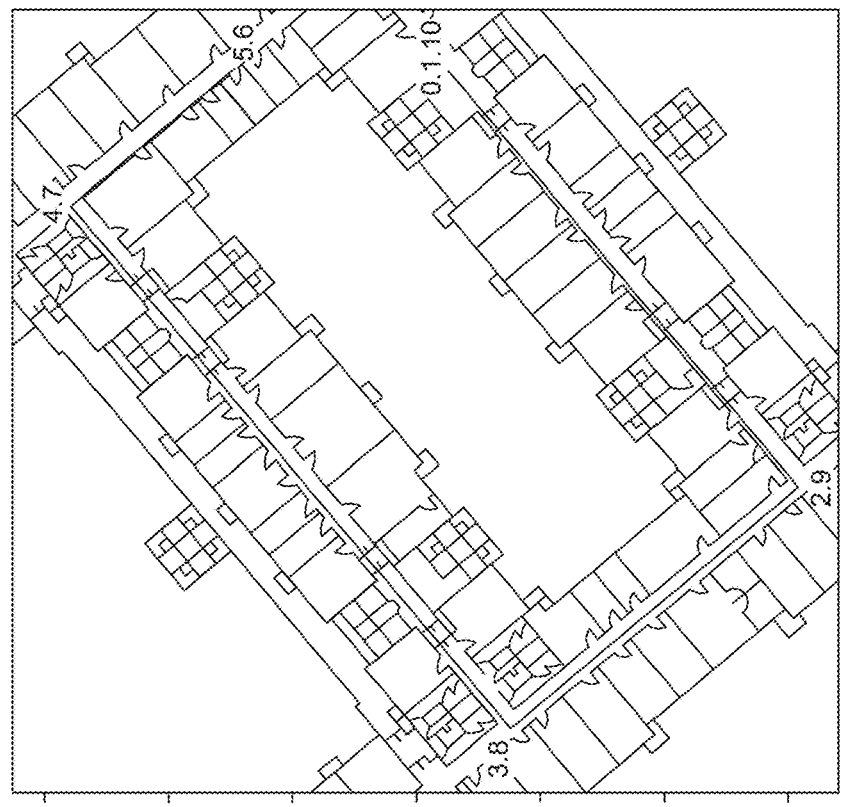
Figure 7B:
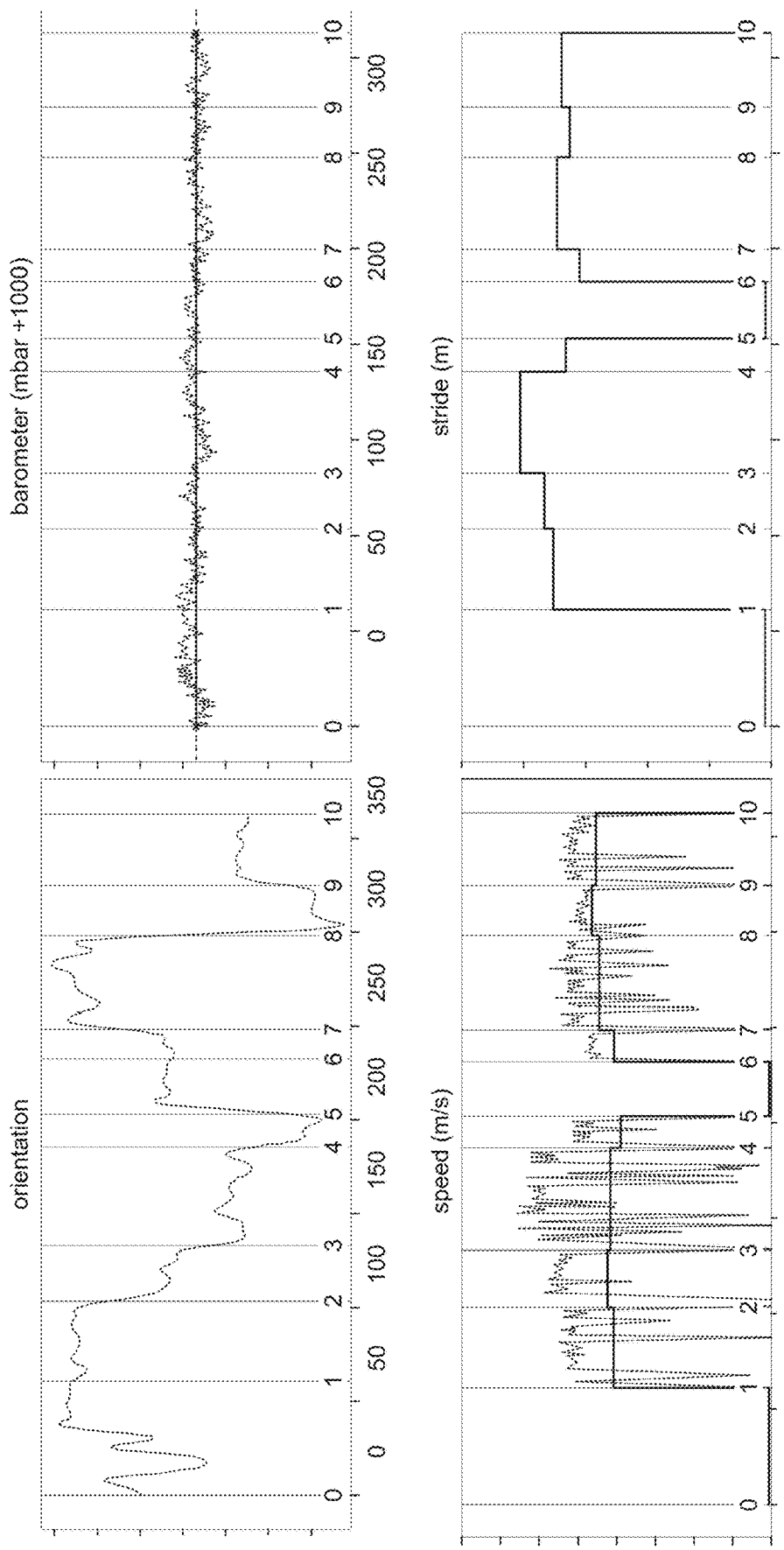

FIGS. 7A and 7B illustrate training data for an example trajectory for training according to the method 600. The left portion of FIG. 7A illustrates an example user's route included in the indoor positioning and indoor navigation of the IPIN Conference challenge. The right portion of FIG. 7A illustrates associated sensor data from accelerometer, gyroscope, magnetometer, and barometer sensors, as well as speed and stride estimates. The example route spans 10 points, starting by turning (powering) on the smartphone at point 0 and letting a calibration terminate. The user then walks through points 1, 2, 3, 4 to point 5. From point 5, the user turns to return toward point 1, creating point 6, and walks through points 7, 8, 9 back to the starting position (point 10). Points 1 to 5 and 7 to 10 are landmarks, because they involve direction changes. The landmark detector module, as described above, is trained to identify points 1 to 5 and 7 to 10 as landmarks, based on detecting orientation changes.

The left panel of FIG. 7B illustrates how orientation changes correlate with the detected landmark positions 1 to 5, and 7 to 10 of the user trajectory. The lower right panel of FIG. 7B illustrates that parameter data indicates that the trajectory is within a fixed floor, and further displays estimated stride lengths for each trajectory segment between two landmarks.

The systems and methods described in this disclosure have been evaluated to the offline setting of the IPIN competition, which involves the task to recreate a path chosen by a person holding a smartphone, based on the readings of the smartphone's sensors. Sensor data was recorded and stored in a logfile using the "Get Sensors Data" Android application. The competition data also includes a set of landmarks including user positions at given time stamps. The training data set provided in the competition data includes 50 logfiles corresponding to fifteen different user trajectories of length of five minutes each, that were traversed multiple times in both directions. A validation (test/evaluation) set includes 10 logfiles associated with ten different trajectories of ten minutes length. While in the training logfiles, all significant turns are annotated as landmarks, the validation set includes trajectories between two consecutive landmarks that are not necessarily along a straight line and may include turns, U-turns, stops, and other types of movements. The evaluation logfile of the IPIN competition includes recordings of the sensor data for 20 minutes without any landmark information. The challenge is to recreate the path of the user based on the sensor's data in the evaluation logfile, providing the user position estimations every 0.5 seconds.

The merits of the described systems and methods are evaluated below by ablating different components and measuring the corresponding localization errors.

TABLE 1

| IPIN'19 Indoor Localization Challenge | | | | | MAE [m] | 50% Err[m] | 75% Err*[m] | 90% Err[m] |
|---|---|---|---|---|---|---|---|---|
| Winner | | | | | 2.0 | 1.5 | 2.27 | 5.1 |
| 2$^{nd}$ place (*) | | | | | 1.7 | 1.3 | 2.36 | 3.9 |
| 3$^{rd}$ place | | | | | 2.1 | 1.8 | 2.54 | |
| Disclosed pipeline | | | | | MAE | 50% | 75% | 90% |
| PLs | RPs | Model | Wi-Fi | PRJ | [m] | Err[m] | Err*[m] | Err[m] |
| | | RNN | ✓ | ✓ | 1.79 | 1.33 | 2.44 | 4.50 |
| ✓ | | RNN | ✓ | ✓ | 1.53 | 1.29 | 1.92 | 3.31 |
| ✓ | ✓ | RNN | | ✓ | 2.10 | 1.56 | 2.85 | 4.49 |
| ✓ | ✓ | RNN | ✓ | | 1.74 | 1.47 | 2.19 | 3.32 |
| ✓ | ✓ | RNN | ✓ | ✓ | 1.64 | 1.28 | 1.99 | 3.45 |
| | | CNN | ✓ | ✓ | 1.98 | 1.42 | 2.46 | 4.51 |
| ✓ | | CNN | ✓ | ✓ | 1.54 | 1.16 | 1.99 | 3.21 |
| ✓ | ✓ | CNN | | ✓ | 1.97 | 1.38 | 2.32 | 5.01 |
| ✓ | ✓ | CNN | ✓ | | 2.22 | 1.89 | 2.83 | 4.11 |
| ✓ | ✓ | CNN | ✓ | ✓ | 1.58 | 1.05 | 1.80 | 3.70 |

The results of IPIN'19 challenge and MAE (mean absolute error), 50%, 75% and 90% errors for the systems and methods described herein, by ablating pseudo labels (PLs), RPs (relative positions), Wi-Fi and map-free projections (PRJ).

Table 1 on the top reports the three top results of the challenge and presents results of the systems and methods described herein using CNN and RNN as neural networks as deep PDR models. Table 1 reports results when evaluating pseudo-labels, employing Wi-Fi-based absolute position estimation and map-free projection. As can be seen from Table 1, the best performance of 1.80 meters in the 75% error, is obtained for a system with CNN module as deep PDR model, together with employing pseudo-labels and recurrence plots for generating the graphical representations of the sensor data. In comparison, the winner of the IPIN '19 challenge reported a 75% error of 2.27 meters. Ablating Wi-Fi positioning and map-free projection components may indicate that both of these components may play an important role for improving accuracy, for both CNN and RNN models.

Figure 11:
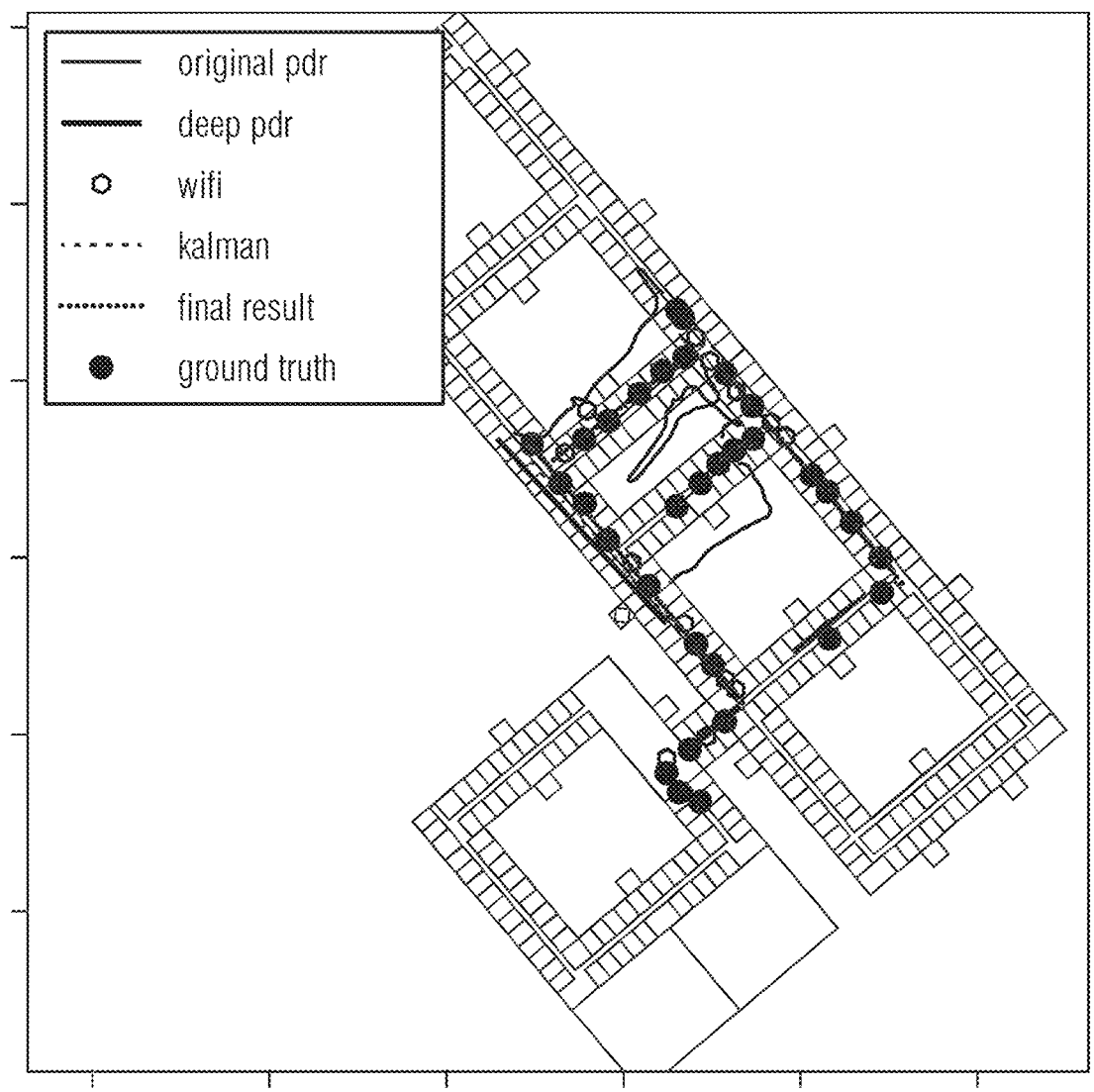
FIG. 11 illustrates positions estimations generated.

FIG. 11 illustrates positions estimations generated according to components of the system 200 described above and estimations of another (original) PDR method.

Further aspects of the present invention relating to the absolute position estimations generated by the pipeline of 242, 244, 246, 248, addressing the problem of indoor localization using magnetic field data provided by sensors are described below.

Indoor magnetic signatures are disturbances of the Earth's magnetic field induced by various ferromagnetic objects, such as walls, pillars, doors, and elevators. These anomalies become more dominant as the distance to the observation point decreases. A multitude of indoor ferromagnetic objects and the disturbances they induce form signatures with unique patterns, which allows classifying these signatures based on their patterns. The magnetic field data may be obtained by sensors, such as a magnetometer, which may part of a mobile/portable computing device, such as a mobile phone. Accordingly, an application executed by one or more processors of a mobile computing device can provide sensor based positioning and navigation in an indoor environment.

Magnetic data, collected while users navigate in an indoor environment, may have a sequential nature, which can be formed as a multi-variate time series. In embodiments, the multi-variate time series is converted (e.g., by one or more processors) into one or more visual/graphical representations, such as one or more images. These images can represent different magnetic patterns. The graphical representations may form a multichannel input to convolutional layers that extract position vector embeddings. In an example, the graphical representations can be input to fully connected (FC) layers. The FC layers can be trained in classification mode to determine the closest landmark or, in regression mode, to directly estimate the user's position coordinates.

These two approaches, the regression-based and landmark/classification-based, are complementary in their concepts of deploying magnetic sensor data. Therefore, they can be combined in a multi-task manner. A wing loss technique can be used to combine the two components by estimating the confidence of each component's estimations and producing a more accurate localization estimator. However, both methods may be inaccurate in similar situations, such as where similar magnetic signatures are experienced in different places. This may be attributable to, for example, the same magnetic anomalies being caused by the same type of ferromagnetic objects, for example, identical armature pillars placed in the different corners of a hall.

In various implementations, a deep learning approach may be used to benefit from advances in deep neural networks, including convolutional and recurrent layers and their training. In various implementations, the localization context is captured with recurrent layers, which replace the fully connected layers in a multi-channel deep regression, to help the system or model disambiguate similar magnetic patterns. The convolutional layers extract position embeddings while recurrent layers encode the localization context in internal states to disambiguate similar magnetic field patterns. The model may be a neural network module including a convolutional neural network (CNN) with one or more convolutional layers and a recurrent neural network (RNN) with one or more recurrent layers.

Models for sequential data may be exposed to a bootstrapping problem. Some models may accumulate magnetic sensor data to produce a first estimation. In practice, such an accumulation can take 5-10 seconds or another suitable period. Recurrent models may have another constraint in that they may have knowledge of the starting point of a trial. In an embodiment, an approximated location from one or more other models, such as the landmark-based classification or CNN-based regression model, or from other sensors, such as Wi-Fi signals, may be used to provide the starting point location. The approximated location from one or more other models may be noisy however. Accordingly, in various implementations, the model may be tested with a starting point estimation error.

Evaluations on the MagPie dataset have shown that systems and methods described herein contribute to a robust and accurate localization system. Indeed, the localization error for three MagPie buildings can be reduced to 0.30-1.05 m, thus improving error by a large margin over other methods. Model training and evaluation in the pipeline can be done offline. The testing phase can be done online, because the network is feed forward with already observed data.

The systems and methods described herein may include a method of converting a local reference frame associated with a local magnetic sensor, e.g., a magnetometer from mobile computing device, into global reference frame. The magnetic field data may form a multi-variate time series. The method may include converting the multi-variate time series into multi-channel 2D sequences. This allows replacing pattern detection in time series by pattern mining in images and benefits from the progress in convolutional and recurrent neural networks. Evaluation of methods according to embodiments on the MagPie dataset shows a low localization error and an improvement over other methods by a large margin. Embodiments make the magnetic field based positioning systems competitive and comparable to Wi-Fi, Bluetooth, and PDR methods, without requiring any investment in associated infrastructure.

Figure 8:
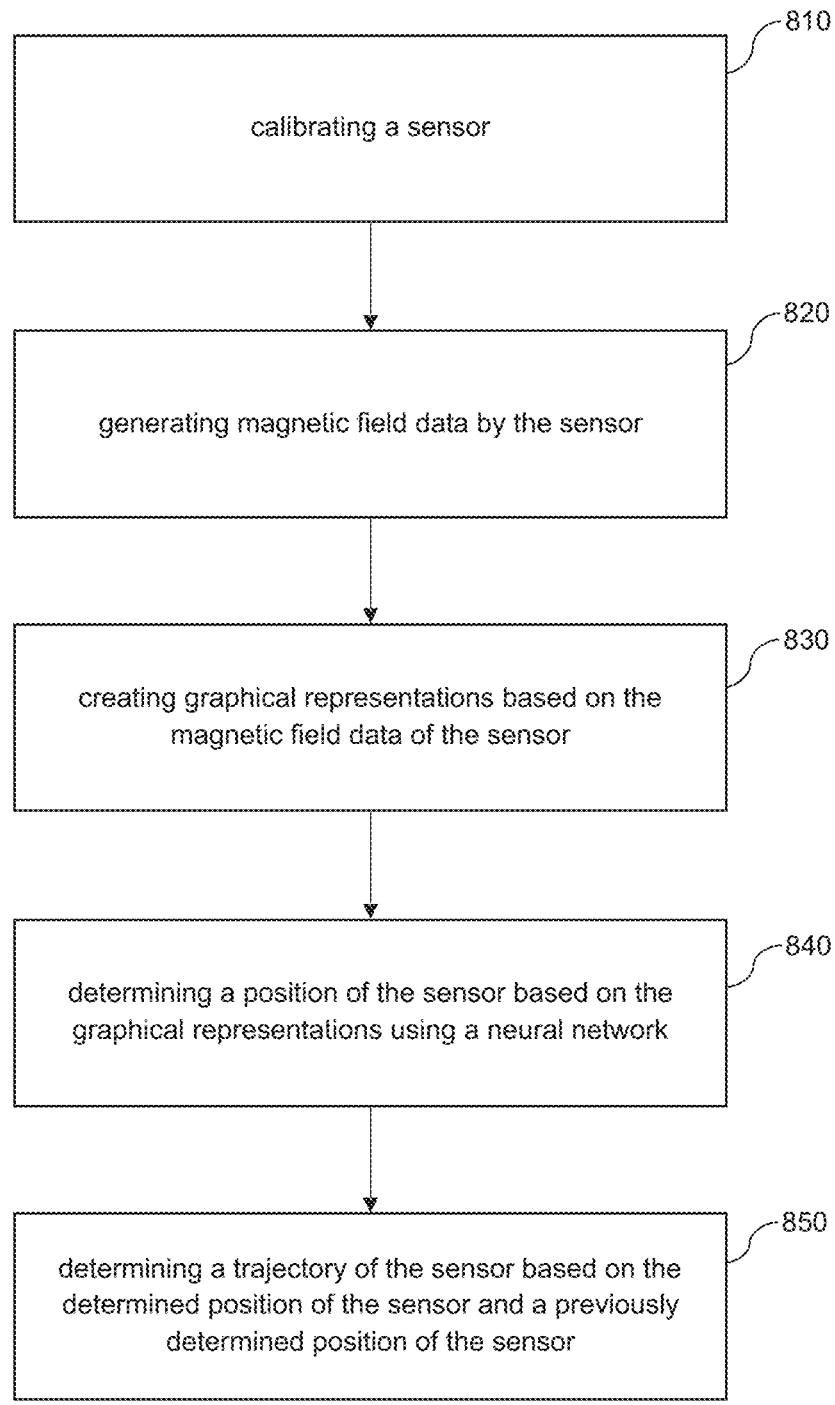
FIG. 8 illustrates a flowchart illustrative of a method for indoor localization.

FIG. 8 is a process flow diagram of an exemplary method 800 for indoor localization. Method 800 may be applied as a stand-alone solution for indoor positioning estimation. Alternatively, method 800 or one or more portions may be performed as part of 110 of method 100 described above.

Optionally at 810, the method may include calibrating one or more sensors, such as a magnetometer, a gyroscope, and/or an accelerometer of a mobile computing device. For example, the gyroscope may be used to transform a reference frame of a sensor, such as the magnetometer, into a global reference frame.

At 820, magnetic field data may be generated by a sensor, e.g., the magnetometer, of the one or more calibrated sensors. The magnetic field data may include a time series of magnetic field values. For example, the sensor (magnetometer) may detect changes in the magnetic field when the sensor is moved in a building or in proximity of objects that alter with the magnetic field of the Earth. The sensor can detect magnetic signatures, which are a based on the magnetic field of the Earth and ferromagnetic objects. These signatures may be referred to as anomalies because they disturb the magnetic field of the Earth. The impact of structures may become more dominant as the distance to the observation point decreases and vice versa. Consequently, the signatures may display uniqueness in their patterns, which allows for classifying signatures based on the patterns.

At 830, visual representations are created based on the magnetic field data of the sensor. 830 may include selecting a subset of magnetic field values of the time series of magnetic field values, and transforming the subset of magnetic field values or a projection of the subset of magnetic field values into one or more two-dimensional images. The graphical representations may include at least one of a recurrence plot (RP), a Gramian Angular Field, such as a Gramian Angular Summation Field (GASF), and/or a Gramian Angular Difference Field (GADF), and a Markov Transition Field (MTF). For example, the graphical representations may include at least two, three, or all of a recurrence plot, a Gramian Angular Field, such as a Gramian Angular Summation Field, and a Gramian Angular Difference Field, and a Markov Transition Field, which may be input simultaneously in the neural network module for a single timestamp.

A first graphical representation, created in accordance with a first method, and a second graphical representation, created in accordance with a second method different from the first method, may be input simultaneously in the multi-channel input to the one or more convolutional layers, where the first graphical representation and the second graphical representation are obtained from a same set of magnetic field values. The first and the second method may be methods selected from a group comprising or consisting of methods for generating a recurrence plot, a Gramian Angular Field, such as a Gramian Angular Summation Field, a Gramian Angular Difference Field, and a Markov Transition Field.

At 840, a position of the sensor is determined based on the visual representations using a neural network module. The neural network module includes a convolutional neural network and a multichannel input to a convolutional layer of the convolutional neural network. The neural network module may include a recurrent neural network comprising one or more gated recurrent units. The one or more recurrent layers may follow the one or more convolutional layers. The method may also include initializing the recurrent neural network with one or more starting positions obtained from a positioning system, such as an indoor positioning system. For testing, the recurrent neural network may be initialized with a noisy ground truth point or a position obtained from the training/testing/validation data.

840 may include inputting, to the neural network module, a set of visual representations, associated with a first timestamp, of the visual representations and at least one of: (i) one or more previously determined positions, (ii) previously determined feature vectors, and (iii) one or more sets of visual representations associated with respective timestamps different from the first timestamp.

By determining an absolute position of the portable electronic device based at least in part on the graphical representations using a neural network module comprising one or more convolutional layers and a multichannel input to the one or more convolutional layers, an improved method of determining an absolute position of the portable electronic device within the indoor environment in an accurate manner is provided.

At 850, a trajectory (e.g., heading direction) of the sensor is determined based on the determined position of the sensor and a previously determined position of the sensor.

The Magnetic Positioning Indoor Estimation (MagPIE) dataset is a dataset for the evaluation of indoor positioning algorithms that use magnetic anomalies. The dataset contains IMU (inertial measurement unit) and magnetometer measurements along with associated ground truth position measurements that have centimeter accuracy. The data was collected in three different buildings on the University of Illinois Urbana-Champaign (UIUC) campus: the Coordinated Sciences Laboratory (CSL), the Talbot Laboratory, and the Loomis Laboratory. The dataset includes data points of a walking person (WLK) with a mobile phone and of a UGV (unmanned ground vehicle). Two different testing scenarios are available: one without any imposed changes to the magnetic field of the building (Outlier Free) and a second set with objects (With Outliers) added to the scene that change the magnetic field of the building. Validation/testing and/or training may be performed using data from the MagPIE dataset.

In various implementations, the method of estimating an absolute position of a portable electronic device from magnetic field data may include a mobile phone-based localization method including determining a position of a user and/or the mobile phone by analyzing mobile phone sensor data at any time. As the floor (vertical elevation) of a building may be accurately detected from pressure sensor (e.g., barometer) data, a 3D localization problem can be reduced to a simpler, 2D localization problem, where the user's position is described by two values $pos_x$ and $pos_y$.

In a mobile phone, an accelerometer, a gyroscope, and a magnetometer of the mobile phone provide their measurements in a local reference frame. Accelerometer and gyroscope sensors can be used to convert magnetic sensor values from local to a global reference frame (e.g., see FIG. 9). In the following it can be assumed that the magnetic field data does not depend on the phone's orientation in space. The phone's orientation in space refers to the global reference frame, and thus forms a multivariate time series including three values $(m_x, m_y, m_z)$ at timestamp t. Training and testing datasets may include sets of trials. Training trial may include magnetic field data and ground truth positions: $D_{train}=(t, m_x, m_y, m_z, pos_x, pos_y,$ where t is the measurement timestamp. For a testing trial, the ground truth positions may be unavailable, $D_{test}=(t, m_x, m_y, m_z)$. The dataset includes a set of single pedestrian trials through an indoor environment, such as a building. Trials can be collected on different days and in different parts of the building.

Mobile phone sensors may not be synchronized meaning that they may capture measurements at different timestamps and different frequencies. As for any further processing, the sensor measurements may be synchronized and aligned at the same timestamps.

Build-in magnetometers are low cost sensors and their measurements of the magnetic field may be altered by errors including sensor fabrication errors and the magnetic deviations induced by the platform (e.g., components of the mobile computing device) and environment. Therefore, the magnetometer may be calibrated prior to the measurement to achieve high accuracy.

Magnetic deviations may be caused by ferromagnetic elements present in the surroundings of the magnetometer. The magnetic deviations may include a permanent magnetism and an induced magnetism. The permanent magnetism may be referred to as the hard iron effect, whereas induced magnetism may be referred to as the soft iron effect. Hard iron effects result from permanent magnets and magnetic hysteresis, that is, remnants of magnetized iron materials, and is equivalent to a bias vector $b_m$. Soft iron effects result from the interaction of ferromagnetic elements with an external field, which induces magnetism. This changes the intensity as well as the direction of the sensed magnetic field. The soft iron effect can be modeled as a 3×3 matrix A.

A three-axis magnetometer may measure a magnetic field strength along orthogonal axes related to the mobile phone. In the absence of any magnetic interference, the magnetometer readings measure the Earth's magnetic field. If magnetometer measurements are taken when the sensor is rotated through all possible orientations, the measurements would lie on a 3D sphere in the absence of magnetic interference. The radius of the sphere is the magnetic field strength. The magnetometer can be calibrated by estimating $b_m$ and $\wedge$ from raw magnetic data/measurements. Once $b_m$ and $\wedge$ are found, the calibrated data will be obtained by applying $m_c = \wedge(m_{raw} - b_m)$, where mc is a calibrated magnetic field measurement, $m_{raw}$ is a raw/measured magnetic field, and $b_m$ and $\wedge$ are calibrated values.

Figure 9:
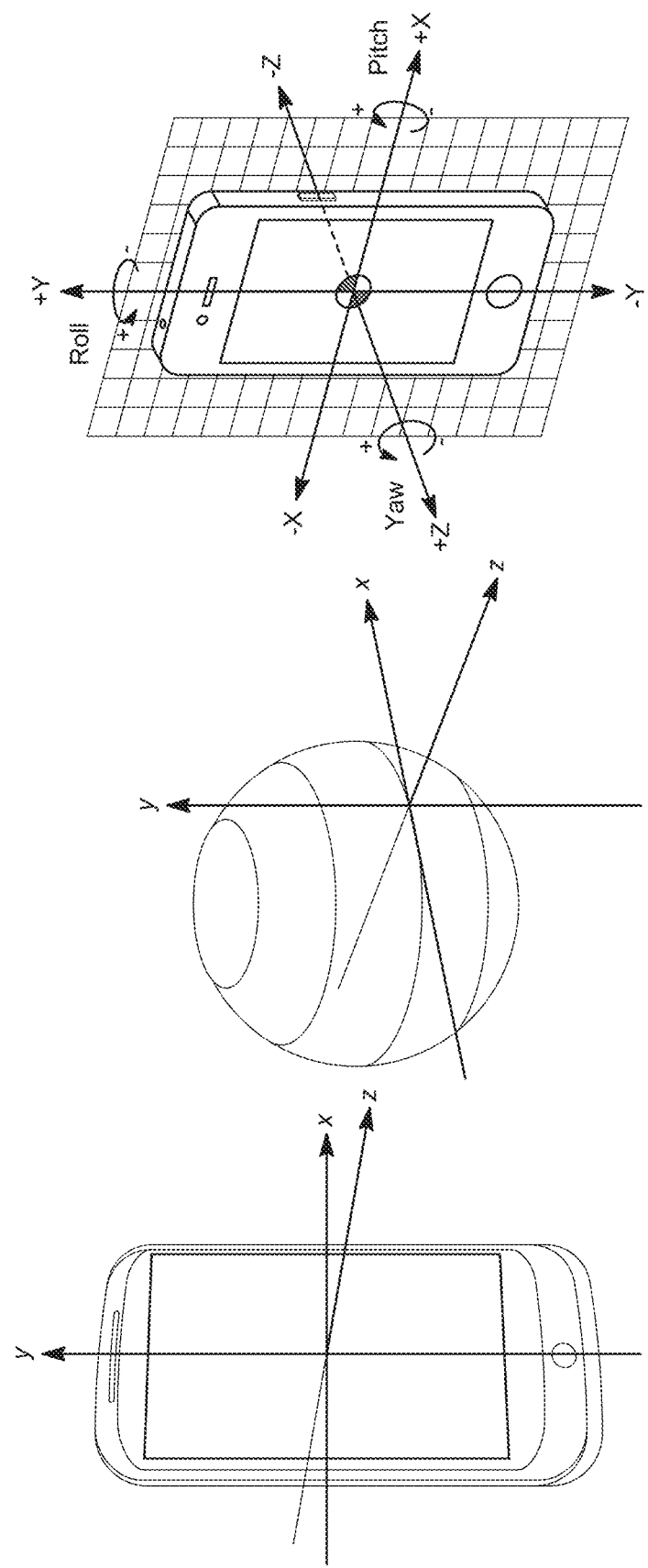
FIG. 9 illustrates example reference frames and rotation angles in relation to a mobile phone.

The orientation of the mobile phone in the space can be described by quaternions or rotation angles (yaw, pitch, roll), such as shown in FIG. 9. Quaternions can be converted to three rotation angles. These rotation angles can be obtained directly from the mobile phone or reconstructed from the gyroscope readings. While moving, a person can hold a mobile phone in various positions/orientations (e.g., upward in front of him/her, near an ear, in a pocket, etc.). Even during a short time, the position/orientation of a mobile phone can change significantly. As the mobile phone's sensors provide their measurements in the local reference frame, rotation angles can be used to convert the measurements to a global reference frame.

In various implementations, magnetic-field based localization may be performed using deep neural networks (DNNs), e.g., for forming graphical representations of magnetic field data in the transformation module 246 of system 200 of FIG. 2. A DNN learning process may include an objective function optimization and neural network weights updating though gradient back-propagation. A model, such as a neural network, may include at least one of a regression model or a classification model. When training regression models, the Mean Square Error (MSE), Mean Absolute Error (MAE), and Huber loss can be used as the objective minimization function. Classification models can be trained with the cross-entropy loss or another suitable type of loss.

The magnetic field values in a single trial represent a multivariate time series. Each observation may include 3 values ($m_x$, $m_y$, $m_z$). The axes x, y and z may not need to be orthogonal. Some orientations in the magnetic field may be more important than others. For example, different combinations and projections, such as $m_{xy}=\sqrt{m_x^2+m_y^2}$ and $m_{xyz}=\sqrt{m_x^2+m_y^2+m_z^2}$, can be calculated based on the magnetic field values. The choice of projections of magnetic field values may be one of the model hyper-parameters.

The sensor data may be pre-processed (e.g., for sensors 242 at module 244 in FIG. 2). Once the projections of the magnetic field values are obtained after the pre-processing, they can be input into the DNN. For example, the feature generation step for a one-dimensional time series V={$v_1$, $v_2 \ldots v_n$} may include applying a sliding window approach. For example, a plurality of subsets may be selected form the time series based on a window size and an overlap. For example, the windows size may be 5-10 seconds worth of measurements and the overlap of the windows may be between 20 and 1 percent, e.g., 10, 5 or 2 percent. For every subset of data points or magnetic field values, a nonlinear transformation from 1D time series to 2D images may be applied to transform the magnetic field patterns into graphical representations. For example, one or more convolutional neural networks can be used to analyze sequential values transformed into recurrence plots (RPs). As RPs address one specific type of recurrence in time series, RPs can be extended with other methods for encoding time series into graphical representations, e.g., 2D visual patterns. Other methods may be, for example, Gramian Angular Summation/Difference Fields (GASF/GADF) and Markov Transition Fields (MTF). These four nonlinear 1D-to-2D transformations are described in more detail below.

Recurrence plots (RPs) may be used for different time series and applications. For the magnetic field data, RPs can be calculated by one or more processors for the Euclidean metric, such as follows:

$$d_{ij} = \|v_i - v_j\| \forall\ i, j \in 1 \ldots n$$

$$RP_{ij} = 1 - \frac{d_{ij}}{\max(d)}$$

The method can be extended to other pairwise distance metrics, such as Minkowski or Manhattan metrics.

In the Gramian Angular Field (GAF), time series can be represented in a polar coordinate system instead of the Cartesian coordinates. Time series values can be rescaled so that all values fall in the interval [−1,1] in order to be represented as polar coordinates.

$$\tilde{v}_i = \frac{(v_i - \max(V)) + (v_i - \min(V))}{\max(V) - \min(V)}$$

$$\theta_i = \arccos(\tilde{v}_i),\quad -1 \le \tilde{v}_i \le 1,\quad \tilde{v}_i \in \tilde{V}_i$$

The polar-encoded time series vector may be transformed into a matrix. If the length of the time series vector is n, then the transformed matrix is of shape (n×n). The GAF may include one of two variants of GAF: Gramian Angular Summation Field (GASF) and Gramian Angular Difference Field (GADF), such as follows $$GASF_{ij} = \cos(\theta_1 + \theta_j)$$

$$GADF_{ij} = \sin(\theta_1 - \theta_j)$$

The Markov Transition Field (MTF) considers time series as an outcome of a Markov process. The method builds the Markov matrix of quantile bins after discretization and encodes the dynamic transition probability in a quasi-Gramian matrix.

For the time series V, Q quantile bins can be identified and each $v_i$ can be assigned to the corresponding bins $q_j, j \in [1, Q]$. A Q×Q weighted adjacency matrix W can be constructed by counting transitions among quantile bins in the manner of a first-order Markov chain along the time axis, as follows:

$$MTF = \begin{bmatrix} w_{ij|v_1 \in q_i, v_1 \in q_j} & \cdots & w_{ij|v_1 \in q_i, v_n \in q_j} \\ \vdots & \ddots & \vdots \\ w_{ij|v_n \in q_i, v_1 \in q_j} & \cdots & w_{ij|v_n \in q_i, v_n \in q_j} \end{bmatrix}$$

Figure 12:
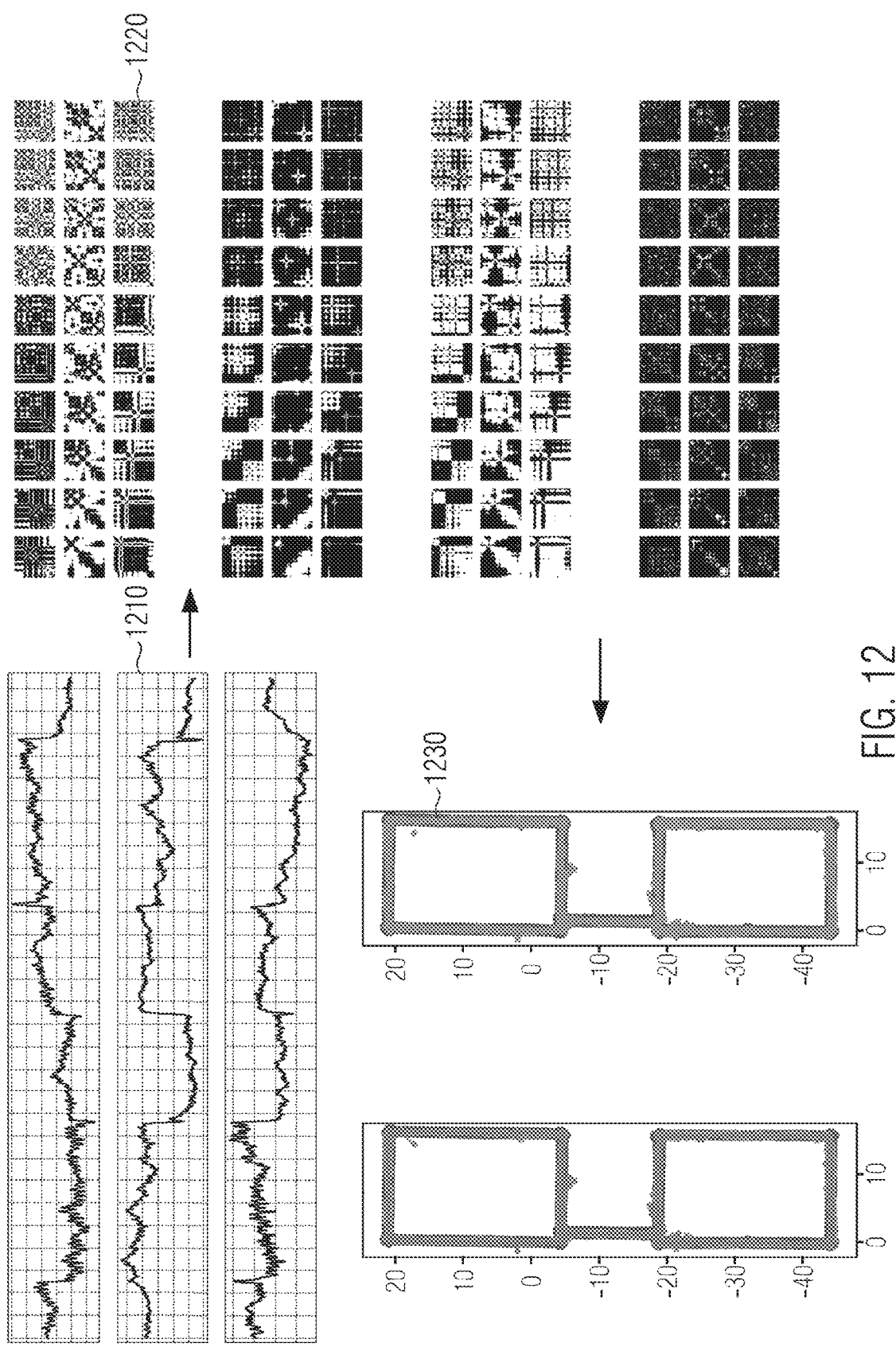
FIG. 12 illustrates a flowchart illustrative of a method for indoor localization.

The four transformations presented above can be visualized by using one trial (CSL Training Trial N 11) from the MagPie dataset with a window size of 7 seconds, a window step size of 1 s, an image size 100 and "canberra" distance metrics. FIG. 12 shows the magnetic field time series 1210 in the global coordinate system for the trial.

FIG. 12 show results of transforming a time series in 2D patterns 1220 (top three rows, sequence of ten recurrence plots for three dimensions x, y, z; second three rows from top, ten consecutive Gramian Angular Summation Field plots for three dimensions x, y, z; third three rows from top, ten consecutive Gramian Angular Difference Field plots for three dimensions x, y, z; last/bottom three rows, ten consecutive Markov Transition Field plots for three dimensions x, y, z) using the RP, GASF, GADF and MTF methods presented above. All the images are generated on a segment from 7 to 24 seconds from the magnetic field time series 1210. Images are built for original magnetic values ($m_x$, $m_y$, $m_z$) separately.

In the following, three different neural networks according to embodiments for determining an absolute position of a portable electronic device based on magnetic field data are discussed. In embodiments of system 200 described above, the neural network module 248 may be configured according to or include the following neural networks.

Figure 13:
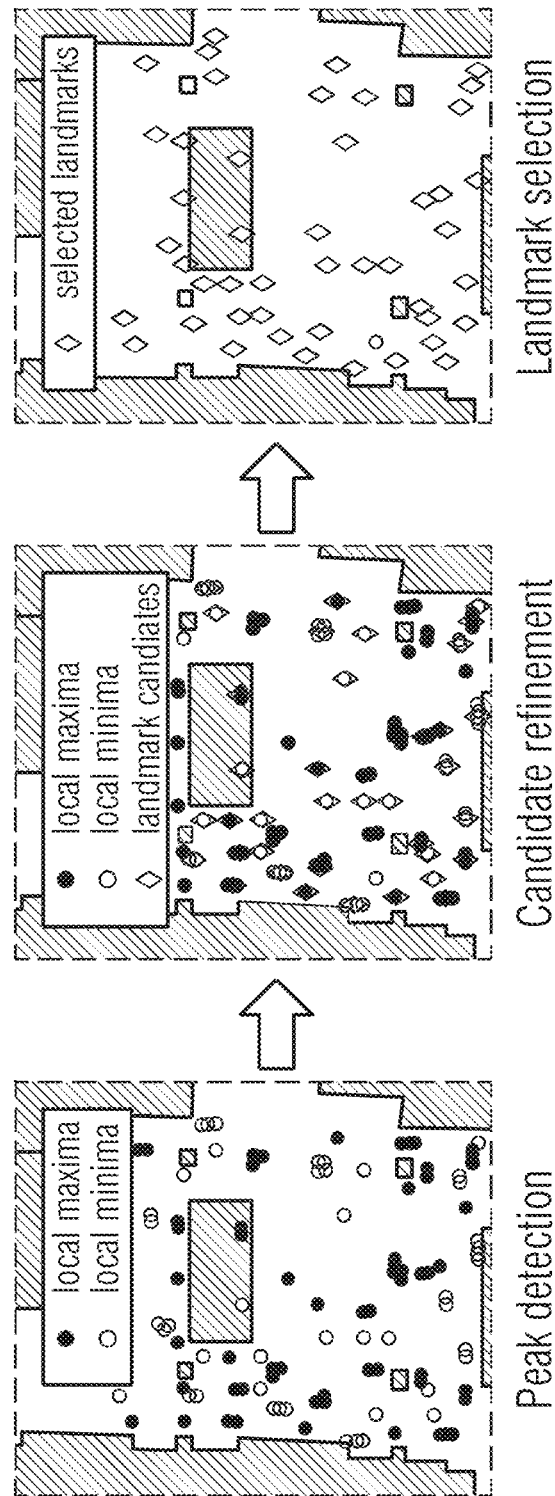
FIG. 13 illustrates a flowchart illustrative of a method for selecting landmarks.

The first neural network will be called a landmark-based classification model. For this model, magnetic maps are constructed, which includes detecting magnetic landmarks. The model is trained to classify a correct position of a mobile computing device as one (e.g., a nearest one) of the landmarks. In more detail, a magnetic grid map is constructed by interpolating magnetic data. Then, a smoothing process may correct errors caused by a sensor reading offset. Landmark detection may include local minima/maxima (peaks) detection, magnetic landmark candidate refinement (to remove outliers), and magnetic landmark selection, such as shown in FIG. 13.

Magnetic landmarks may be ferromagnetic objects that have larger or smaller magnetic intensities than their surroundings. Therefore, magnetic landmark candidates can be identified using the model by finding the local minima/maxima in a magnetic map.

Not all points may be used as magnetic landmarks for positioning. Outliers exist among these points depending on the indoor geomagnetic environment and magnetic landmark characteristics. In some areas, magnetic intensity may minimally change. Furthermore, the magnetic intensities of some magnetic landmarks fluctuate over time. Fluctuations can be caused by electromagnetic elements, such as electric motors. Such fluctuations may generate clusters of local minima/maxima. Magnetic landmark candidate refinement may help to solve the problem. A Euclidean distance-based hierarchical tree can be used by the model to group these points as one magnetic landmark candidate.

Most of the landmark candidates have much higher or lower values than the mean magnetic intensity. However, the magnetic intensity of some candidates is similar to the average intensities, so no magnetic sequence pattern may be created. Thresholds can be set to automatically identify these candidates and to filter them. The thresholds may be calibrated.

Once the magnetic landmarks are selected or determined, the localization task may be reduced to identifying the closest landmark. A classifier can be used to determine the closest landmark.

The model input can be a N-channel tensor. N is an integer greater than 1. For example, N can be 12 with 3 channels for each of RP, GASF, GADF, and MTF. The classification architecture may include two convolutional layers that extract position embeddings, and two fully connected layers that determine classification. For example, for the CSL building 30 magnetic landmarks can be determined. Therefore, the output layer may have 30 neurons (e.g., as in FIG. 10A). The Loss function may be the cross-entropy loss or another suitable loss.

For the second neural network, which will be called a CNN+FC regression model, the landmark based classification may be replaced with a direct absolute position regression. The CNN+FC regression model replicates the landmark classification architecture, but the output layer may have only 2 neurons—for the x- and y-position ($pos_x$ and $pos_y$). Alternatively, the output layer may have 3 neurons for the x-, y- and z-position. For the objective minimization function MSE loss, MAE loss, Huber loss, or another suitable loss may be used. The CNN+FC regression model makes the system independent of the magnetic field map quality and the selected landmarks. However, the landmark-based and the CNN-based regression models may have decreased accuracy when facing similar magnetic patterns in different locations.

In various implementations, navigation is taken into account to disambiguate similar magnetic patterns in different locations. The third neural network will be called a CNN+RNN regression model. For this model, the FC layers are replaced with recurrent layers. Recurrent neural networks (RNNs) can be used for working with sequential, regular timestamp-based data. The training protocol may be changed for an RNN and data may be processed in a trial-by-trial manner and not a point-by-point manner. For each track, the position estimations $pos_{x_1, \ldots, t}$, $pos_{y_1, \ldots, t}$ are generated sequentially, where the previous estimations are used in estimating the next position $pos_{x_{t+1}}$, $pos_{y_{t+1}}$.

Figure 10A:
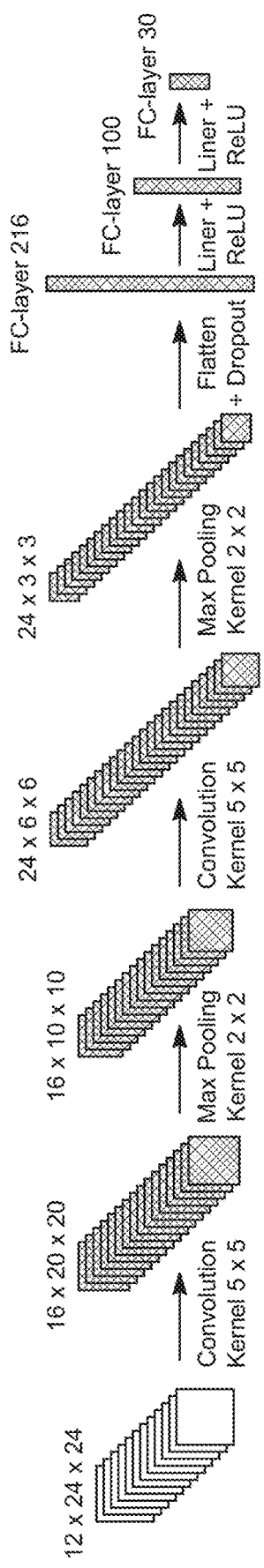
FIGS. 10A and 10B illustrate example neural network architectures.
Figure 10B:
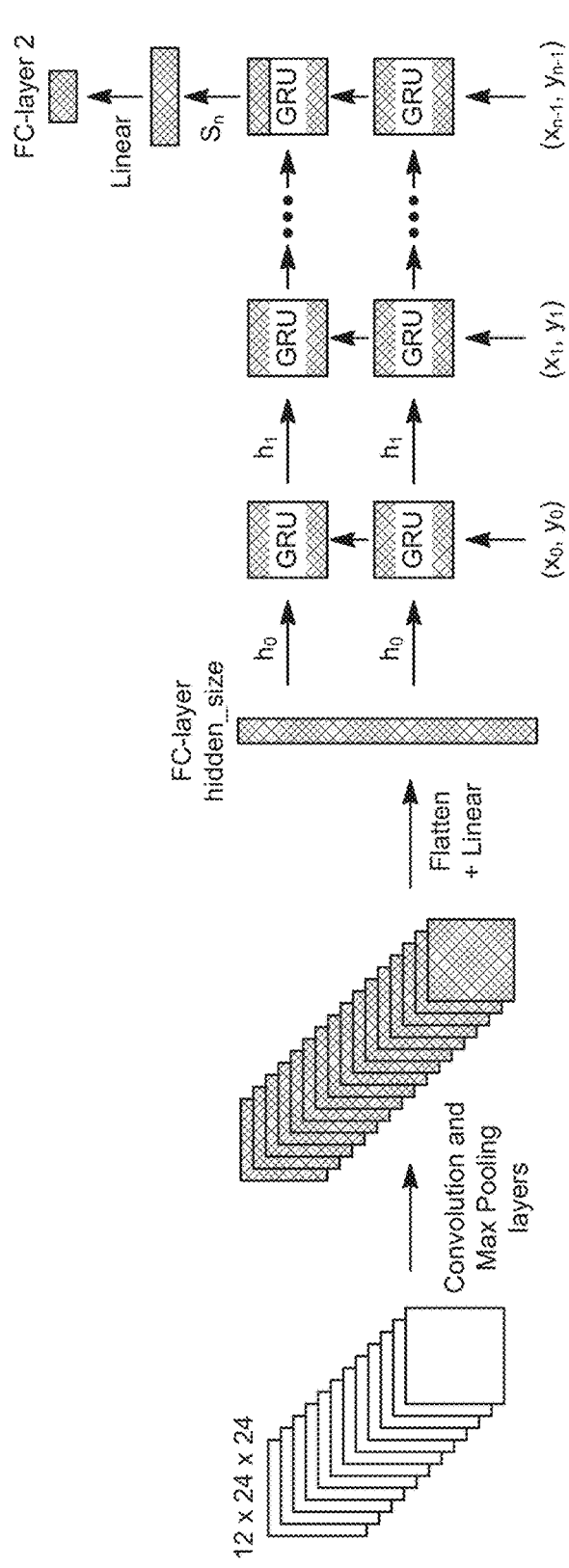

The CNN+RNN regression model may include a multi-channel CNN+RNN deep regression model. The CNN+RNN regression model preserves convolutional layers to extract position embeddings, but replaces FC layers with recurrent layers. FIG. 10B shows an example architecture of CNN+RNN regression model. The CNN+RNN regression model includes a convolutional neural network with one or more convolutional layers and a recurrent neural network with at least one recurrent layer, such as a 2-layer one-directional RNN on GRU (gated recurrent unit) cells.

The RNN may accept input sequences of varying lengths. The CNN+RNN regression model may start by making an estimation of a location based on a first graphical representation of the magnetic field data at a first timestamp. Subsequently, the CNN+RNN regression model may estimate a next location based on the first graphical representation and a second graphical representation of the magnetic field data at a second timestamp. A next location may be estimated by the CNN+RNN regression model based on at least some graphical representations associated with respective previous timestamps or previously determined locations. Alternatively, other indoor positioning systems may be used to determine earlier locations that can then be used to estimate a next location of a sensor or user by the CNN+RNN regression model. A maximum number of previously determined locations or previously created graphical representations for the RNN layers may be predefined or calibrated. As a result, the CNN+RNN regression model can use the sequence of one, more than one, or all the previously determined locations or previously created graphical representations or a maximum number (e.g., 10-20) of previously determined locations or previously created graphical representations for the next estimation.

Alternative sensors and localization systems can be used to determine the first position or location, for example, from Wi-Fi or Bluetooth signals. As the average distance error of Wi-Fi-based localization may be 2-3 meters, this error can be simulated in both training and testing phase, by adding a random noise to the starting point position.

Models have been evaluated on the MagPIE dataset. The three buildings, CSL, Loomis, and Talbot, have different layouts and different complexity of localization. In addition to training and test datasets, a validation dataset is used for early stopping (e.g., to stop training when the neural network starts to overfit). The CNN+FC regression models show a good result for the CSL building. Results for all buildings, all three models, and 1, 3, 9, 12 channels are presented in Table 1. The CNN+FC Landmark-based classification model uses landmarks for classification, which confirmed that buildings differ greatly in their magnetic field anomalies and signatures. Acceptable results have been obtained for CSL. The CNN+RNN Deep Regression model takes the trajectory context into account, which helps solving the pattern ambiguity problem and allows reducing considerably the localization error. The estimations by the CNN+RNN models results for a building are illustrated by 1230 in FIG. 12.

Table 2 below summarizes the performance of the three methods for the three buildings. Additionally, the table reports localization errors when the number of channels vary 1 (x for RP), 3 (x,y,z for RP) 9 (x,y,z for RP, GASF and GADF) or 12 (x,y,z for all methods). The results illustrate that using multiple channels contribute to a final low error.

TABLE 2

Localization error [meters] of the deep regression and landmark classification methods for 1, 3, 9 and 12 channels.

| Building | N channels | CNN + FC Landmarks | CNN + FC Regression | CNN + RNN Regression |
|---|---|---|---|---|
| CSL | 1 | 5.15 | 5.09 | 5.80 |
|  | 3 | 2.16 | 1.47 | 4.61 |
|  | 9 | 1.16 | 0.97 | 0.81 |
|  | 12 | 0.95 | 0.98 | 0.30 |
| Loomis | 1 | 8.13 | 8.50 | 7.36 |
|  | 3 | 6.62 | 6.72 | 22.51 |
|  | 9 | 5.77 | 6.16 | 1.15 |
|  | 12 | 4.62 | 5.05 | 1.07 |
| Talbot | 1 | 9.27 | 11.32 | 6.91 |
|  | 3 | 6.79 | 6.91 | 4.04 |
|  | 9 | 4.95 | 4.90 | 1.17 |
|  | 12 | 4.49 | 4.72 | 1.06 |

For all models, the starting point estimation may be noisy for both training and test trials. The noise may be simulated as the normal distribution with the mean of 0 m and variance of 3 m. The model may be trained in accordance with hyper-parameters. Example hyper-parameters may include the number of RNN layers, the pairwise distance metric, the number of starting points, the starting point noise, and the teacher forcing probability.

The systems and methods described herein provide for multiple improvements for estimating absolute positions based on magnetic field data, including converting magnetic field time series into 2D representations to enable using CNN-based models processing the localization as deep regression of user's position without landmarks and enabling algorithms to bootstrap.

The systems and methods described herein address a problem caused by magnetic pattern ambiguity, by taking into account entire trajectories of a sensor or user, which represents the trial context, and using a neural network including CNN layers followed by RNN layers. The ambiguity of the magnetic field patterns may affect the results of CNN+FN models, which faces the task of distinguishing between magnetic patterns, which are very similar but located in very different places of an indoor space. Instead, recurrent models take into account the context of trajectories of a sensor and/or a user as inner RNN states. This helps disambiguate the pattern locations by considering the navigational content, given by the recurrent model's previous states. Development of the pipeline and evaluation can be done offline. The systems and methods described herein can run online in the testing phase, because they feed forward the network with already observed data.

One issue when using RNNs may be a delay for the first points in trajectories. To overcome this problem, models with a smaller window size or models that determine fewer points in the trajectory for the next point may be used. After a first (main) model collects the necessary data for an estimation, a second (smaller) model can be switched off.

Another note with RNNs is the knowing the starting point of the trajectory at test time and accumulating data for the starting N seconds. As a solution to this bootstrapping problem, RNNs can use estimations of the first points from other sensor data (e.g., floor estimation from pressure sensor and localization estimation from Wi-Fi signals).

While some specific embodiments have been described in detail above, it will be apparent to those skilled in the art that various modifications, variations, and improvements of the embodiments may be made in light of the above teachings and within the content of the appended claims without departing from the intended scope of the embodiments. In addition, those areas in which it is believed that those of ordinary skill in the art are familiar have not been described herein in order to not unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or with a combination of hardware and software. The implementation can be performed using a non-transitory storage medium such as a computer readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may be stored on a computer-readable storage medium.

In an embodiment, memory (or a data carrier, or a computer-readable medium) comprises, stored thereon, the computer program or the computer-executable instructions for performing one of the methods described herein when it is performed by a processor. In a further embodiment, an apparatus includes one or more processors and the memory.

In a further embodiment, an apparatus comprises means, for example processing circuitry, e.g., a processor communicating with a memory, the means being configured to, or adapted to perform one or more of the methods described herein.

A further embodiment comprises a computer having installed thereon the computer program or instructions for performing one or more of the methods described herein.

Figure 14:
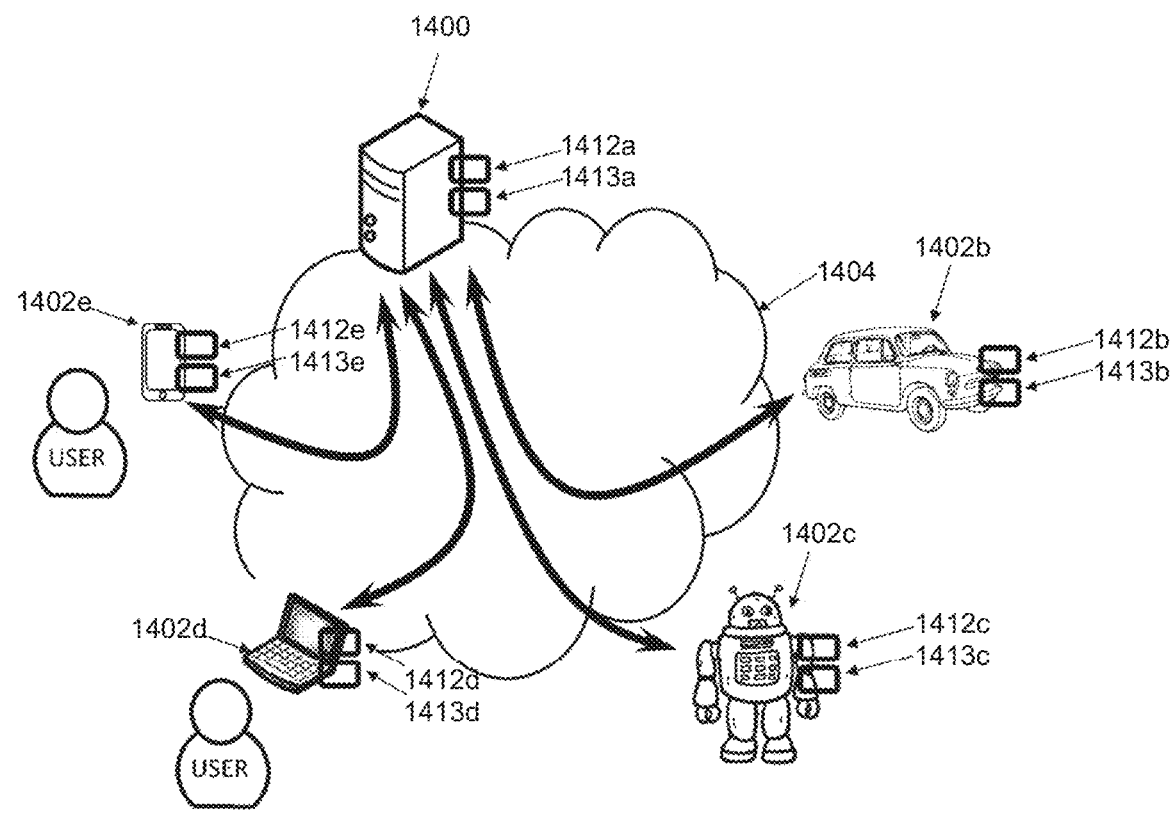
FIG. 14 illustrates an example architecture in which the disclosed systems methods may be employed.

The above-mentioned methods and embodiments may be implemented within an architecture such as illustrated in FIG. 14, which includes a server 1400 and one or more computing devices 1402 that communicate over a network 1404 (which may be wireless, wireless, or a combination of wired and wireless) such as the Internet for data exchange. The server 1400 and the computing devices 1402 each include one or more processors, such as processors 1412a-e, and memory, such as memory 1413a-e. The computing devices 1402 may be any type of computing device that communicates with the server 1400, including a vehicle 1402b (e.g., autonomous), robot 1402c, computer 1402d, or mobile (cellular) phone 1402e (collectively computing devices 1402).

More precisely in an embodiment, the methods according to the embodiment of FIG. 1, 6, or 8 may be performed at the server 1400. The architectures of FIGS. 2-5, 10A, or 10B may be implemented within the server 1400. In other embodiments, the methods according to the embodiments of FIG. 1, 6, or 8 may be performed at one or more of the computing devices client device 1402 partially or completely. In yet other embodiments, the methods may be performed at a different server or on a plurality of servers in a distributed manner.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++,C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of determining a position of a portable electronic device in an indoor environment, the method comprising:
at a first rate, updating an absolute position of a portable electronic device within the indoor environment based on at least one of radio signal data and magnetic field data captured using the portable electronic device;
at a second rate that is different than the first rate, selectively updating an estimated displacement of the portable electronic device within the indoor environment, the updating the estimated displacement comprising generating an estimated displacement, by a neural network module, based on inertial sensor data of the portable electronic device; and
determining a present position of the portable electronic device within the indoor environment by updating a previous position based on at least one of (a) the estimated displacement and (b) the absolute position.

2. The computer-implemented method of claim 1, wherein generating the estimated displacement based on the inertial sensor data includes converting the inertial sensor data to a graphical representation and generating the estimated displacement based on the graphical representation.

3. The computer-implemented method of claim 1 wherein the neural network module includes at least one of a convolutional neural network, a bidirectional recurrent neural network, and a neural network.

4. The computer-implemented method of claim 1 further comprising, using the neural network module, determining an activity classification based on the inertial sensor data and generating the estimated displacement further based on the activity classification.

5. The computer-implemented method of claim 4 wherein determining the activity classification includes determining the activity classification using a feed-forward network of the neural network module.

6. The computer-implemented method of claim 4 wherein the activity classification is selected from the group consisting of (a) moving and (b) not moving.

7. The computer-implemented method of claim 6 wherein generating the estimated displacement includes setting the estimated displacement to zero displacement when the activity classification is set to (b) not moving.

8. The computer-implemented method of claim 1, wherein updating the absolute position includes generating the absolute position based on the radio signal data using a variational autoencoder trained to generate the absolute position from radio signal data.

9. The computer-implemented method of claim 1 wherein the second rate is faster than the first rate.

10. The computer-implemented method of claim 1 wherein the updating the absolute position includes updating the absolute position based on the magnetic field data.

11. The computer-implemented method of claim 10 wherein updating the absolute position includes:

generating graphical representations based on the magnetic field data, wherein the magnetic field data includes a time series of magnetic field values; and
determining the absolute position of the portable electronic device, using a neural network module, based on the graphical representations.

12. The computer-implemented method of claim 11 wherein the neural network module includes one or more convolutional layers and a multichannel input to the one or more convolutional layers.

13. The computer-implemented method of claim 11, wherein the generating the graphical representations includes:
selecting a subset of magnetic field values of the time series of magnetic field values; and
generating one or more two-dimensional images based on the subset of magnetic field values,
wherein determining the absolute position includes determining the absolute position based on the one or more two-dimensional images.

14. The computer-implemented method of claim 11, wherein the graphical representations include at least one of a recurrence plot, a Gramian Angular Summation Field, a Gramian Angular Difference Field, and a Markov Transition Field.

15. The computer-implemented method of claim 11, wherein the graphical representations include at least two different ones of a recurrence plot, a Gramian Angular Summation Field, a Gramian Angular Difference Field, and a Markov Transition Field, wherein the at least two different ones are generated based on the magnetic field values.

16. The computer-implemented method of claim 12, wherein the neural network module includes one or more recurrent layers, and wherein the one or more recurrent layers receive input from the one or more convolutional layers.

17. The computer-implemented method of claim 12 wherein the neural network module is trained based on characteristics of the magnetic field of the Earth measured within the indoor environment.

18. The computer-implemented method of claim 1 further comprising initializing the neural network module with a starting position of the portable electronic device.

19. A computer-implemented method of training a neural network module to estimate a position of a portable electronic device within an indoor environment, the computer-implemented method comprising:
training, with sensor training data, a motion classifier module of the neural network module to determine a present user activity,
wherein the sensor training data includes inertial sensor data captured while a portable electronic device moved along a path within one or more indoor environments;
training, with the sensor training data, a landmark classifier module of the neural network module to detect landmarks within one or more indoor environments;
generating labels and annotating the sensor training data with the labels, the generating the labels including generating the labels based on user activities determined by the motion classifier and landmarks detected by the landmark classifier; and
further training the neural network module based on (a) the sensor training data and (b) the labels, respectively.

20. The computer-implemented method of claim 19 further comprising by the landmark classifier module:
estimating orientation vectors from the inertial sensor data; and detecting a landmark based on a change in the orientation vectors.

21. A computer-implemented method of determining an absolute position of a portable electronic device within an indoor environment from magnetic field data, the computer-implemented method comprising:

generating graphical representations based on magnetic field data including a time series of magnetic field values, the magnetic field data generated by a sensor of the portable electronic device within the indoor environment; and determining an absolute position of the portable electronic device within the indoor environment based on the graphical representations using a neural network module, the neural network module including:

one or more convolutional layers; and a multichannel input to the one or more convolutional layers.

22. The computer-implemented method of claim 21, wherein the generating graphical representations based on the magnetic field data includes:

selecting a subset of magnetic field values of the time series of magnetic field values; and transforming one of (a) the subset of magnetic field values and (b) a projection of the subset of magnetic field values into (c) one or more two-dimensional images; and generating the graphical representations based on the one or more two-dimensional images.

23. The computer-implemented method of claim 21, wherein the graphical representations include at least two different ones of a recurrence plot, a Gramian Angular Summation Field, a Gramian Angular Difference Field, and a Markov Transition Field, wherein the at least two different ones are generated based on the magnetic field values.

24. The computer-implemented method of claim 21, wherein the neural network module includes one or more recurrent layers that receive input from the one or more convolutional layers.

25. The computer-implemented method of claim 21 further comprising initializing the neural network module with one or more starting positions obtained from a positioning system.

26. The computer-implemented method of claim 21 wherein the neural network module is trained based on characteristics of the magnetic field of the Earth within the indoor environment.

* * * * *